(12) United States Patent
Kano et al.

(10) Patent No.: US 10,968,881 B2
(45) Date of Patent: Apr. 6, 2021

(54) SPARK PLUG

(71) Applicant: NGK SPARK PLUG CO., LTD., Nagoya (JP)

(72) Inventors: Masaru Kano, Nagoya (JP); Kiyoteru Mori, Nagoya (JP); Tomohiro Iwatsuka, Kasugai (JP); Yoshiki Inoue, Nagoya (JP); Keita Nakagawa, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 63 days.

(21) Appl. No.: 16/330,528

(22) PCT Filed: May 22, 2017

(86) PCT No.: PCT/JP2017/018948
§ 371 (c)(1),
(2) Date: Mar. 5, 2019

(87) PCT Pub. No.: WO2018/055833
PCT Pub. Date: Mar. 29, 2018

(65) Prior Publication Data
US 2019/0383258 A1 Dec. 19, 2019

(30) Foreign Application Priority Data
Sep. 22, 2016 (JP) .............................. JP2016-184949

(51) Int. Cl.
*F02P 17/12* (2006.01)
*G01N 27/626* (2021.01)
*H01T 13/20* (2006.01)

(52) U.S. Cl.
CPC ............ *F02P 17/12* (2013.01); *G01N 27/626* (2013.01); *H01T 13/20* (2013.01)

(58) Field of Classification Search
CPC ........ F02P 17/12; G01N 27/626; H01T 13/40; H01T 13/20; H01T 15/00
See application file for complete search history.

(56) References Cited

U.S. PATENT DOCUMENTS

| 5,734,094 A * | 3/1998 | Matsubara ........... G01N 27/626 |
| | | 324/402 |
| 6,617,769 B2 * | 9/2003 | Suzuki ..................... H01T 13/34 |
| | | 123/169 R |

(Continued)

FOREIGN PATENT DOCUMENTS

| JP | 45-032977 | 12/1970 |
| JP | 58-140986 | 8/1983 |

(Continued)

OTHER PUBLICATIONS

International Search Report from corresponding International Patent Application No. PCT/JP17/18948, dated Jun. 20, 2017.

(Continued)

*Primary Examiner* — Dominic E Hawkins
(74) *Attorney, Agent, or Firm* — Kusner & Jaffe

(57) ABSTRACT

The present invention provides spark plug that can improve detection accuracy of pre-ignition caused by flame kernel occurring inside spark plug. Terminal is located at a rear end side with respect to thread portion of metal shell. Detector electrode is provided at a portion located at a top end side with respect to a top end of contact portion between reduced diameter portion and shelf portion or packing in a space formed between outer periphery of insulator and inner periphery of the metal shell. The detector electrode and the terminal are connected by conductor. The detector electrode and the conductor are insulated from center electrode, the metal shell and ground electrode. Since the detector electrode is located in the space between the outer periphery of (Continued)

the insulator and the inner periphery of the metal shell, an early detection of the flame kernel occurring in this space can be possible.

6 Claims, 17 Drawing Sheets

(56) References Cited

U.S. PATENT DOCUMENTS

| | | | | |
|---|---|---|---|---|
| 2006/0090540 A1* | 5/2006 | Gardiner | ............ | F02D 41/1466 73/23.33 |
| 2010/0314987 A1 | 12/2010 | Kyuno et al. | | |
| 2011/0037372 A1* | 2/2011 | L'Henoret | .............. | G01L 23/10 313/141 |
| 2011/0193471 A1* | 8/2011 | Kato | ........................ | H01T 21/02 313/141 |
| 2015/0188294 A1* | 7/2015 | Nishida | .................... | H01B 3/12 174/110 R |
| 2016/0258411 A1* | 9/2016 | Kinoshita | ................ | H05H 1/46 |

FOREIGN PATENT DOCUMENTS

| | | |
|---|---|---|
| JP | H04-133281 | 5/1992 |
| JP | H06-338377 | 12/1994 |
| JP | H09-260023 | 10/1997 |
| JP | 2014-109196 | 6/2014 |
| JP | 2015-190396 | 11/2015 |
| KR | 10-2010-0086491 | 7/2010 |

OTHER PUBLICATIONS

Office Action received in corresponding Japanese Patent Application No. 2016-184949, dated Apr. 11, 2018 (English abstract included).
Office Action received in corresponding Japanese Patent Application No. 2016-184949, dated Jun. 19, 2019.
Notification of Reason for Refusal issued in connection with corresponding Korean Patent Application No. 10-2019-7008003, dated Apr. 14, 2020.

* cited by examiner

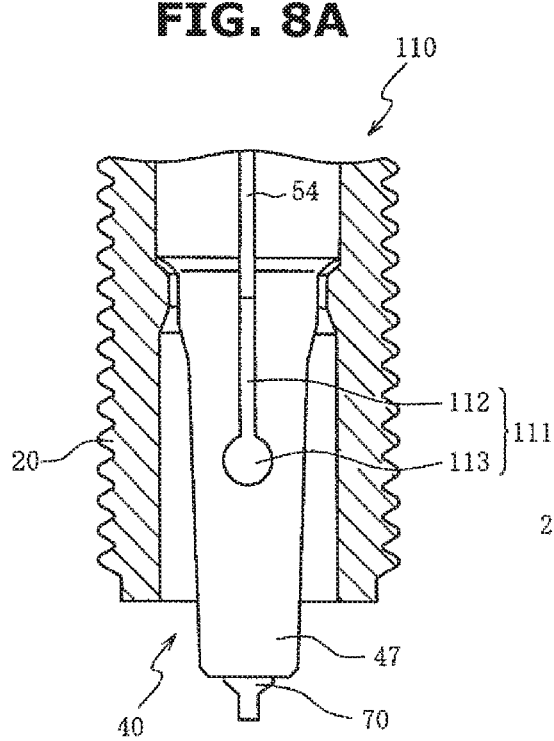
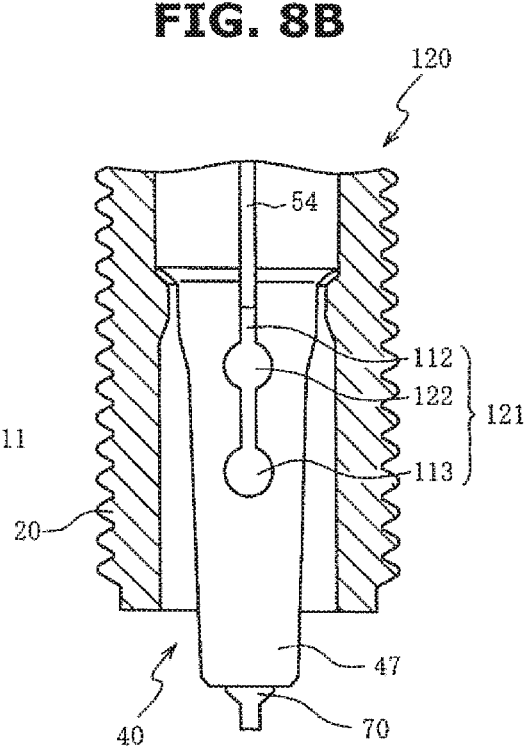
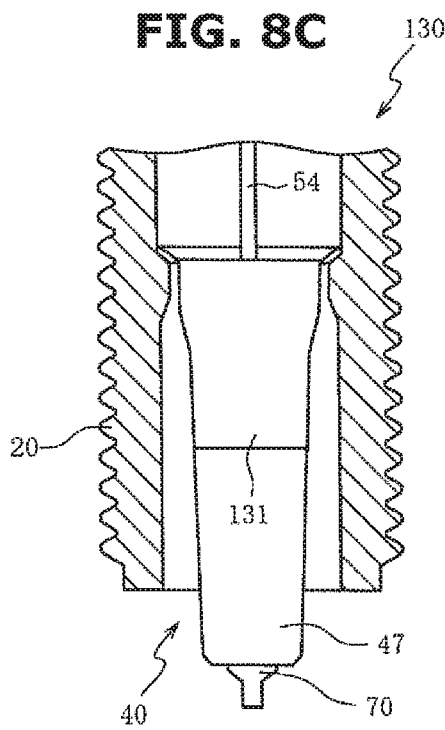
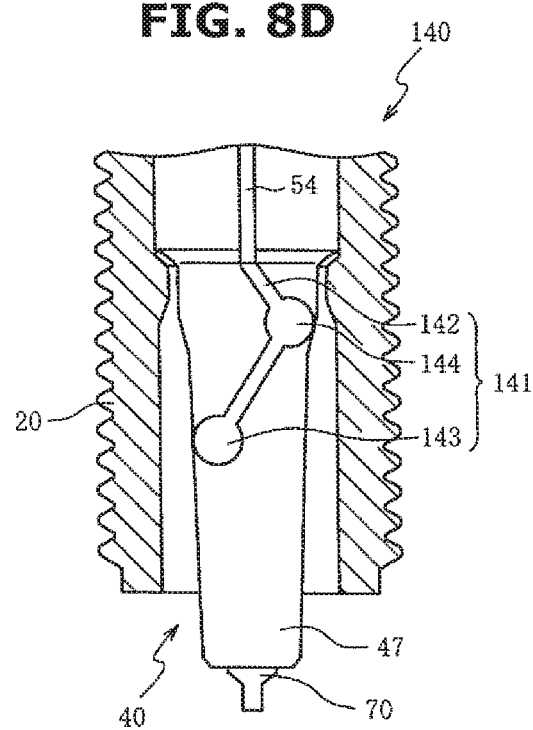

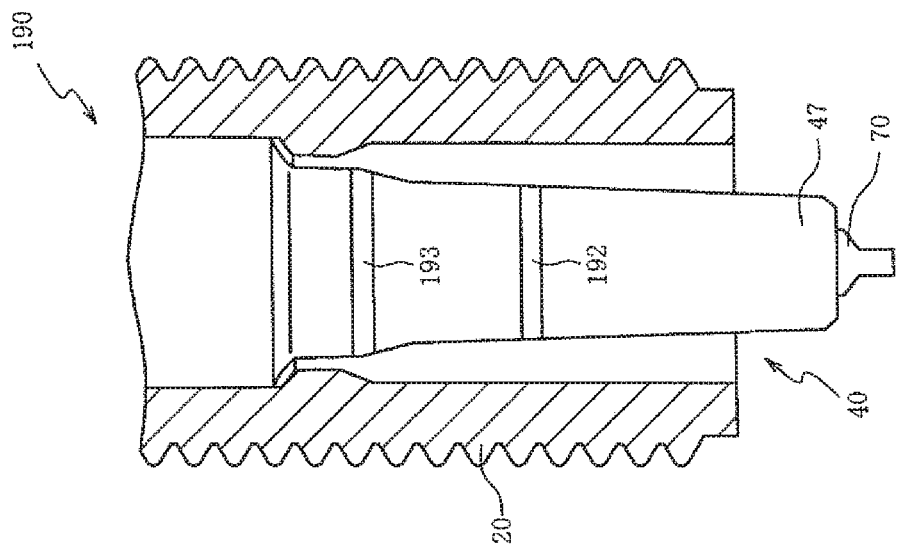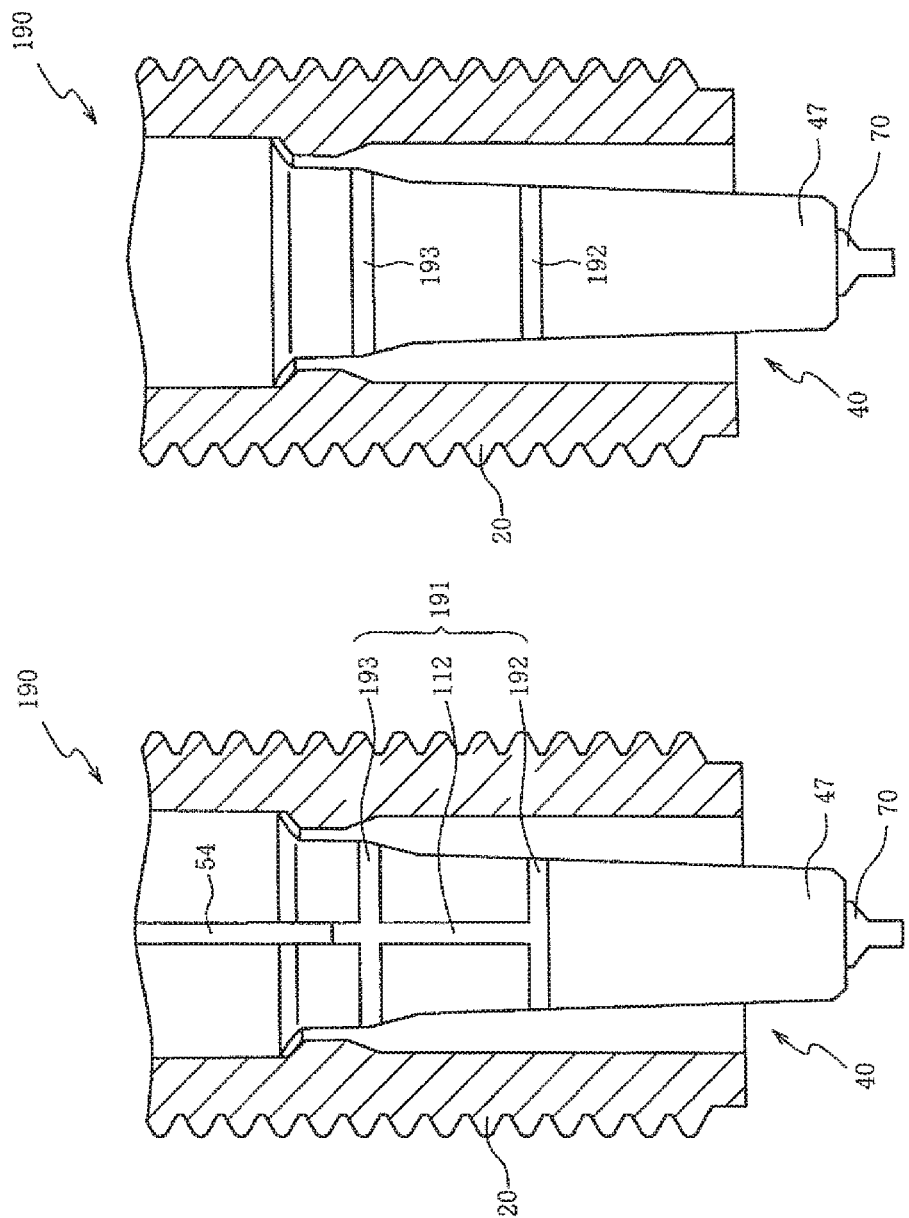

SPARK PLUG

TECHNICAL FIELD

The present invention relates to a spark plug, and more particularly to a spark plug that is capable of improving detection accuracy of a pre-ignition.

BACKGROUND ART

There are known a technique that discriminates combustion states of an internal combustion engine by detecting an ion current that is generated when a flame appears between a center electrode and a ground electrode of a spark plug and reaches the center electrode and the ground electrode (Patent Documents 1 and 2), and a spark plug that detects the ion current with an electrode, which is different from the ground electrode, provided and arranged close to the center electrode (Patent Documents 3 and 4). Further, there is also known a technique that adjusts or controls an ignition timing of the spark plug according to the discriminated combustion states of the internal combustion (Patent Document 5). According to these techniques, it is possible to accurately detect a pre-ignition that occurs by the fact that an overheated spark plug becomes a heat source and a pre-ignition that is caused by a self-ignition of carbon. The combustion state of the internal combustion can be controlled according to the detection result.

CITATION LIST

Patent Document

Patent Document 1: Japanese Unexamined Patent Application Publication No. JP2015-190396
Patent Document 2: Japanese Unexamined Patent Application Publication No. JPH04-133281
Patent Document 3: Japanese Unexamined Patent Application Publication No. JPH06-338377
Patent Document 4: Japanese Unexamined Patent Application Publication No. JPH09-260023
Patent Document 5: Japanese Unexamined Patent Application Publication No. JP2014-109196

SUMMARY OF THE INVENTION

Technical Problem

The above techniques, however, have a problem of not being able to accurately detect a pre-ignition that is caused by a flame kernel that occurs inside the spark plug, which has been found out by a recent research.

The present invention was made in order to solve the above problem. An object of the present invention is therefore to provide a spark plug that is capable of improving detection accuracy of the pre-ignition caused by the flame kernel occurring inside the spark plug.

Solution to Problem and Effects of Invention

In order to achieve the object, according to a spark plug recited in claim 1, a tubular insulator having a reduced diameter portion whose outside diameter becomes smaller toward a top end side of the spark plug is provided with an axial hole which extends from the top end side toward a rear end side of the spark plug along an axis of the spark plug. A center electrode is disposed in the axial hole. A tubular metal shell placed at an outer periphery of the insulator has at an inner periphery thereof a shelf portion and at an outer periphery thereof a thread portion. The shelf portion protrudes inward in a radial direction of the metal shell, and holds the reduced diameter portion of the insulator directly or through a ring-shaped packing from the top end side. A ground electrode connected to the metal shell faces the center electrode through a spark gap.

A terminal is located at the rear end side with respect to the thread portion. A detector electrode is provided at a portion located at the top end side with respect to a top end of a contact portion between the reduced diameter portion and the shelf portion or the packing in a space formed between the outer periphery of the insulator and the inner periphery of the metal shell. The detector electrode and the terminal are connected by a conductor. The detector electrode and the conductor are insulated from the center electrode, the metal shell and the ground electrode.

Since the detector electrode is provided in the space formed between the outer periphery of the insulator and the inner periphery of the metal shell, an early detection of the flame kernel occurring the inside space of the spark plug can be possible. It is therefore possible to improve detection accuracy of the pre-ignition caused by the flame kernel occurring inside the spark plug.

According to a spark plug recited in claim 2, a width in a direction orthogonal to an axis direction of the detector electrode is 0.5 mm or more. As a result, since an area of the detector electrode can be secured, a detection sensitivity of the ion current can be ensured. Therefore, in addition to an effect of claim 1, an effect of suppressing an error detection (meaning that despite the fact that the pre-ignition occurs, the detector electrode cannot detect the pre-ignition) of the pre-ignition can be obtained.

According to a spark plug recited in claim 3, a top end of the detector electrode is positioned at the rear end side with respect to a top end of the metal shell. As a result, since this can make it hard to detect the flame kernel occurring outside the space formed between the outer periphery of the insulator and the inner periphery of the metal shell, in addition to the effect of claim 1 or 2, an effect of surely and accurately detecting the flame kernel occurring in the space can be obtained.

According to a spark plug recited in claim 4, a top end of the detector electrode is positioned 6 mm or more away from a top end of the insulator toward the rear end side. This can therefore reduce the tendency for electric discharge to occur between the center electrode disposed in the axial hole of the insulator and the detector electrode. As a result, in addition to the effect of any one of claims 1 to 3, an effect of suppressing spark wear of the detector electrode can be obtained.

According to a spark plug recited in claim 5, a top end of the detector electrode is positioned 3 mm or more away from the top end of the contact portion toward the top end side. Therefore, the top end of the detector electrode can be set in an area where temperature easily increases by and according to growth of the flame kernel. Since the temperature easily increases, the ion current easily flows. Thus, in addition to the effect of any one of claims 1 to 4, an effect of improving the detection accuracy of the pre-ignition can be obtained.

According to a spark plug recited in claim 6, a first end portion of the ground electrode is connected to the metal shell and a second end portion of the ground electrode crosses the axis of the spark plug and faces the center electrode. And, at least apart of the detector electrode is located at a first end portion side of the ground electrode with respect to an imaginary plane that is a plane including the axis of the spark plug and being perpendicular to a plane that includes an axis extending from the first end portion toward the second end portion of the ground electrode and the axis of the spark plug. Since the flame kernel is apt to occur in an area of the first end portion side with respect to the imaginary plane, by arranging at least a part of the detector electrode to this area, in addition to the effect of any one of claims 1 to 5, an effect of reducing the tendency for the error detection to occur can be obtained.

BRIEF DESCRIPTION OF THE DRAWINGS

FIG. 8A is a left side view of a spark plug with the metal shell cut, according to a second embodiment. FIG. 8B is a left side view of a spark plug with the metal shell cut, according to a third embodiment. FIG. 8C is a left side view of a spark plug with the metal shell cut, according to a fourth embodiment. FIG. 8D is a left side view of a spark plug with the metal shell cut, according to a fifth embodiment.

FIG. 10A is a left side view of a spark plug with the metal shell cut, according to a tenth embodiment. FIG. 10B is a right side view of the spark plug.

EMBODIMENTS FOR CARRYING OUT THE INVENTION

Figure 1:
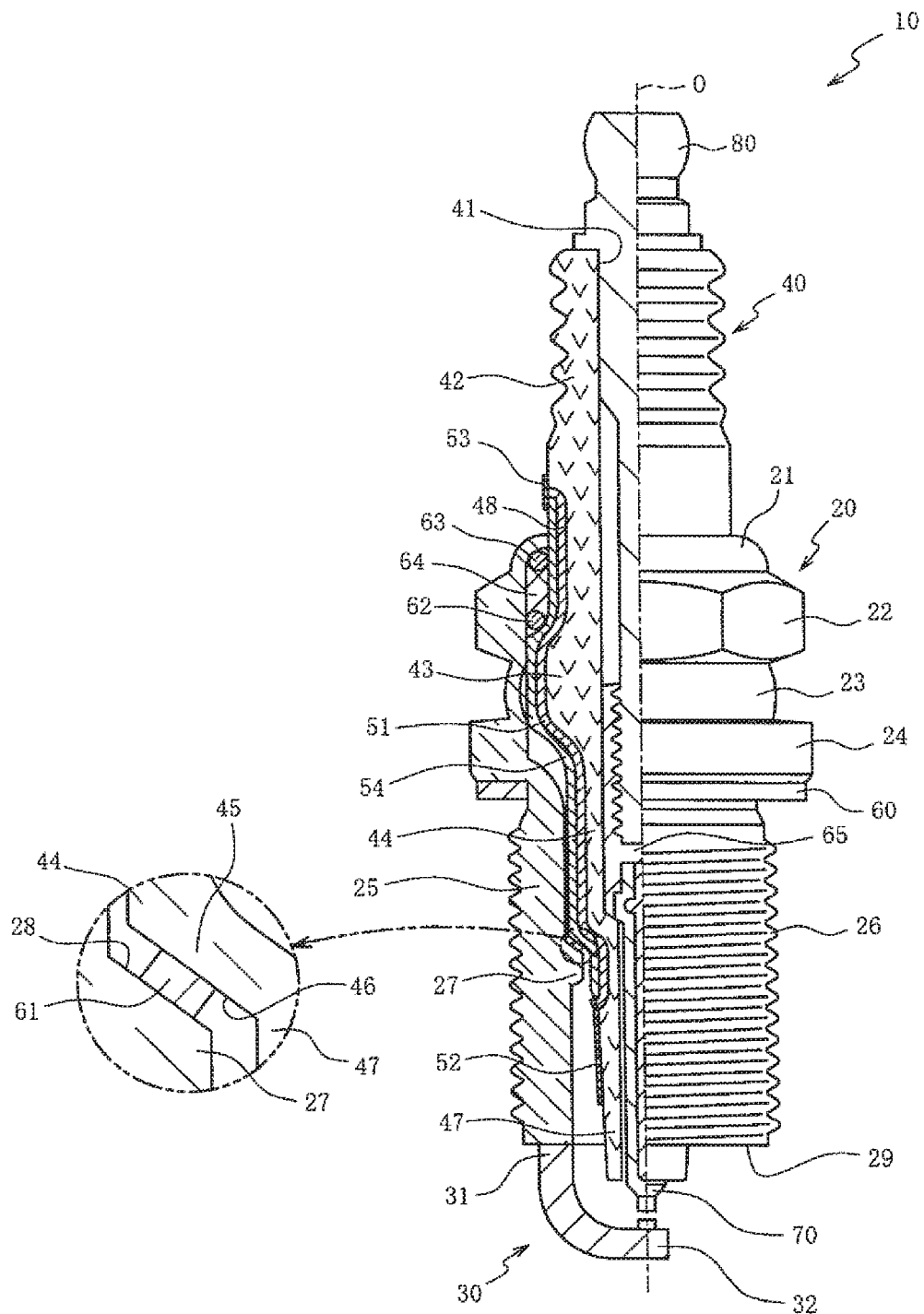
FIG. 1 is a one side cross section of a spark plug according to a first embodiment of the present invention.

Preferred embodiments of the present invention will be explained below with reference to the drawings. FIG. 1 is a one side cross section of a spark plug 10 with an axis O of the spark plug 10 being a boundary, according to a first embodiment of the present invention. In FIG. 1, a lower side of the drawing is called a top end side (or a tip end side) of the spark plug 10, and an upper side of the drawing is called a rear end side of the spark plug 10. As shown in FIG. 1, the spark plug 10 has a metal shell 20, a ground electrode 30, an insulator 40 and a center electrode 70.

The metal shell 20 is a substantially tubular member that is fixed to a screw hole of an internal combustion engine (not shown). The metal shell 20 is made of metal material (e.g. low-carbon steel) having conductivity. The metal shell 20 has, from its rear end side to its top end along the axis O, a caulked portion 21, a tool engagement portion 22, a curved portion 23, a seat portion 24 and a body portion 25 with these portions connected in this order. The body portion 25 is provided, at an outer peripheral surface thereof, with a thread portion 26.

The caulked portion 21 and the curved portion 23 are portions for caulking the insulator 40. The tool engagement portion 22 is a portion with which a tool such as a wrench is engaged when screwing the thread portion 26 into the screw hole (not shown). The seat portion 24 is an annular portion that is located at a rear end side of the body portion 25 and protrudes outward in a radial direction. Between the seat portion 24 and the body portion 25, an annular gasket 60 is provided.

The gasket 60 seals a gap between the screw hole and the thread portion 26 by being sandwiched between the seat portion 24 and the internal combustion engine when the thread portion 26 is screwed and fitted into the screw hole (not shown). A shelf portion 27 is a portion that protrudes inward in the radial direction of the body portion 25. On an annular surface 28 at a rear end side of the shelf portion 27, a packing 61 is provided. The packing 61 is a ring-shaped plate member made of metal material such as soft steel plate (or mild steel plate) that is softer than the metal material forming the metal shell 20.

The ground electrode 30 is a metal-made bar-shaped member (e.g. a nickel based alloy-made bar-shaped member) connected to a top end 29 of the metal shell 20. The ground electrode 30 is bent or curved toward the axis O so as to cross the axis O. A first end portion 31 of the ground electrode 30 is connected to the metal shell 20, and a second end portion 32 crosses the axis O and faces the center electrode 70.

The insulator 40 is a substantially tubular member made of alumina etc. that are superior in mechanical characteristics and insulation performance under high temperature. The insulator 40 is provided with an axial hole 41 that penetrates the insulator 40 along the axis O. The insulator 40 has, from its rear end side to its top end along the axis O, a rear portion 42, a bulging portion 43, a large diameter portion 44, a reduced diameter portion 45 and a small diameter portion 47 with these portions connected in this order.

The insulator 40 is inserted into the metal shell 20, and the metal shell 20 is secured to an outer periphery of the insulator 40. A rear end side of the rear portion 42 of the insulator 40 is exposed from the metal shell 20, and a top end of the small diameter portion 47 protrudes from the top end 29 of the metal shell 20. The bulging portion 43 is a portion that bulges or protrudes outward in the radial direction from a top end side of the rear portion 42. The bulging portion 43 is positioned at a radially inner side of the curved portion 23 of the metal shell 20.

The large diameter portion 44 and the small diameter portion 47 are each positioned at a radially inner side of the body portion 25. An outside diameter of the small diameter portion 47 is smaller than an outside diameter of the large diameter portion 44. The reduced diameter portion 45 whose outside diameter becomes smaller toward its top end side is located at a boundary between the large diameter portion 44 and the small diameter portion 47. A diameter of an outer surface 46 of the reduced diameter portion 45 becomes smaller toward the top end side. The packing 61 is arranged between the surface 28 at the rear end side of the shelf portion 27 of the metal shell 20 and the outer surface 46 of the reduced diameter portion 45 of the insulator 40.

Ring members 62 and 63 and a filler 64 such as talc positioned between these ring members 62 and 63 are provided between an outer periphery of the rear portion 42 of the insulator 40 and an inner periphery of the tool engagement portion 22 of the metal shell 20. When the caulked portion 21 of the metal shell 20 is caulked in the radially inward direction toward the insulator 40, the insulator 40 is pressed toward the surface 28 of the shelf portion 27 of the metal shell 20 through the ring members 62 and 63 and the filler 64. As a result, the packing 61 is plastically deformed with the packing 61 sandwiched between the surface 28 at the rear end side of the shelf portion 27 and the outer surface 46 of the reduced diameter portion 45. The packing 61 hermetically seals a gap between the shelf portion 27 and the reduced diameter portion 45.

The spark plug 10 is provided, at the insulator 40, with a conductor 51 and a detector electrode 52 for detecting an ion current. In the present embodiment, the conductor 51 is embedded in the insulator 40. The insulator 40 has, at the outer periphery thereof, a groove 48 extending from the rear portion 42 to the small diameter portion 47, and the conductor 51 is placed on a bottom of the groove 48. The conductor 51 connects a terminal 53 provided on the outer periphery of the rear portion 42 at a rear end side with respect to the metal shell 20 and the detector electrode 52 provided on an outer periphery of the small diameter portion 47. The detector electrode 52 is arranged between the outer periphery of the insulator 40 and an inner periphery of the metal shell 20. The terminal 53 is a portion to which an external wiring (not shown) is connected.

The conductor 51 and the detector electrode 52 are formed with noble metal such as platinum which has heat resistance and whose resistivity is small. In the present embodiment, the conductor 51 and the detector electrode 52 are formed in the groove 48 by baking or printing a metal paste that contains the noble metal and/or silver etc. The conductor 51 is covered with an insulation member 54 embedded in the groove 48, then the conductor 51 is insulated from the metal shell 20. In the present embodiment, the insulation member 54 is formed by hardening a thermostabile inorganic adhesive.

Since the conductor 51 is formed integrally with a surface (the groove 48) of the insulator 40, as compared with a case where the conductor 51 is arranged between the insulator 40 and the metal shell 20 or a case where the conductor 51 is embedded in the metal shell 20, increase in size of outside diameters of the metal shell 20 and the spark plug 10 can be prevented. Further, since the conductor 51 provided at the insulator 40 is covered with the insulation member 54, a short circuit between the conductor 51 and the metal shell 20 can be prevented while ensuring durability of the conductor 51.

The center electrode 70 is a rod-shaped electrode formed by embedding a core, which is superior to a metal-made electrode base material (e.g. a nickel based alloy-made electrode base material) in thermal conductivity, in the electrode base material having a bottomed tubular shape. The core is made of copper or alloy having copper as a main component. The center electrode 70 is held in and by the axial hole 41 of the insulator 40, and disposed along the axis O. A top end of the center electrode 70 protrudes from the axial hole 41, and faces the ground electrode 30 through a spark gap.

A terminal metal jacket 80 is a rod-shaped member to which a high-tension cable (not shown) is connected. The terminal metal jacket 80 is made of metal material (e.g. low-carbon steel) having conductivity. A top end side of the terminal metal jacket 80 is positioned in the axial hole 41 of the insulator 40. Between the terminal metal jacket 80 and the center electrode 70, a glass seal 65 having conductivity is provided. The center electrode 70 and the terminal metal jacket 80 are electrically connected through the glass seal 65.

The spark plug 10 is manufactured, for instance, by the following manner. The insulator 40 provided with the conductor 51, the detector electrode 52 and the terminal 53 is prepared, and the center electrode 70 is inserted into the axial hole 41 of the insulator 40. The center electrode 70 is set so that the top end of the center electrode 70 protrudes from the axial hole 41 and is exposed to the outside. The terminal metal jacket 80 is inserted into the axial hole 41 of the insulator 40, and an electrical connection between the terminal metal jacket 80 and the center electrode 70 is established. After the metal shell 20 to which the ground electrode 30 is previously connected is assembled to the outer periphery of the insulator 40, by bending or curving the ground electrode 30 so as to face the center electrode 70 in the axis O direction, the spark plug 10 having the spark gap between the center electrode 70 and the ground electrode 30 is obtained.

Figure 2:
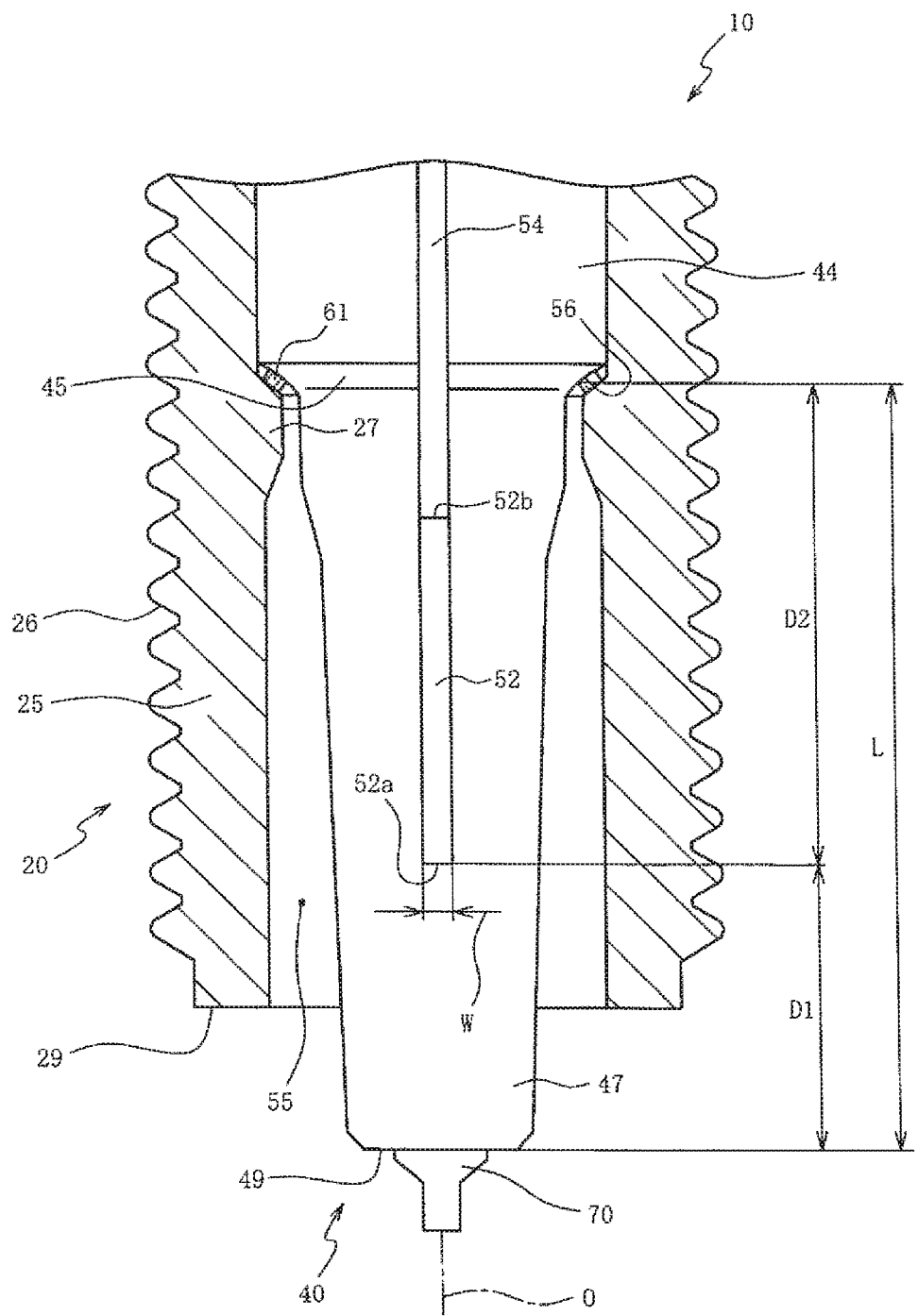
FIG. 2 is a left side view of the spark plug with a metal shell cut.
Figure 3:
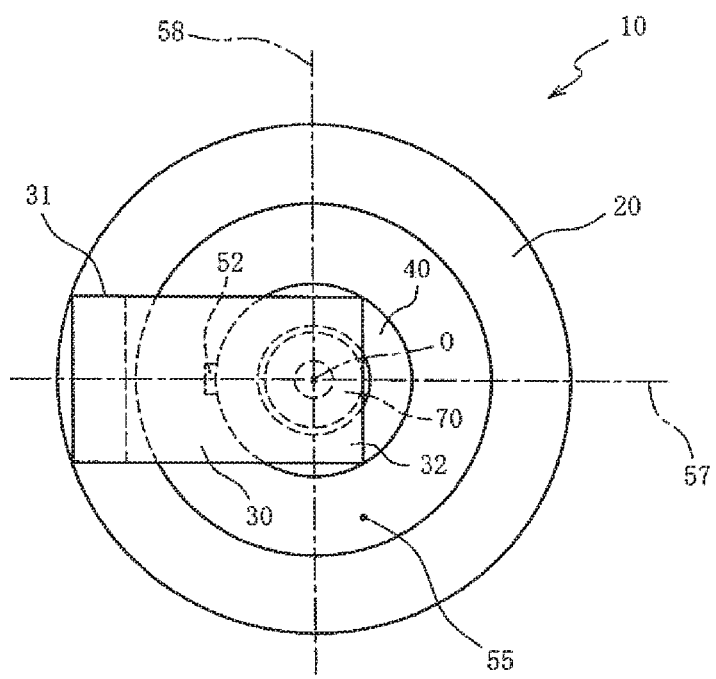
FIG. 3 is a bottom view of the spark plug, viewed from an axis direction.

Next, the detector electrode 52 will be explained with reference to FIGS. 2 and 3. FIG. 2 is a left side view of the spark plug 10 with the metal shell 20 cut (viewed from the first end portion 31 of the ground electrode 30 toward the insulator 40). In FIG. 2, the metal shell 20 and a rear end side (an upper side in FIG. 2) in the axis O direction of the insulator 40 are not illustrated. FIG. 3 is a bottom view of the spark plug 10, viewed from the axis O direction.

As shown in FIG. 2, the detector electrode 52 is formed at the small diameter portion 47 of the insulator 40 so as to have a linear shape along the axis O. The detector electrode 52 is located at a top end side (at a lower side in FIG. 2) with respect to a top end of a contact portion 56 between the outer surface 46 of the reduced diameter portion 45 and the packing 61 in a space 55 formed between the outer periphery of the insulator 40 and the inner periphery of the metal shell 20.

Inventors found out that regarding a low speed pre-ignition (LSPI) that occurs in a low rotation speed heavy load condition of the internal combustion engine upon high compression and/or high supercharge, its source of fire or spark is apt to occur in the space 55. If the detector electrode 52 is set in the space 55 and a potential difference is given between the detector electrode 52 and the metal shell 20, when a flame kernel occurs in the space 55, the ion current flows to the detector electrode 52. By detecting this ion current, an early detection of the LSPI, which indicates that the flame kernel occurs in the space 55, can be possible. It is therefore possible to improve detection accuracy of the pre-ignition caused by the flame kernel occurring inside the spark plug 10.

The detector electrode 52 is arranged so that its top end 52a in the axis O direction is positioned between the top end of the contact portion 56 and a top end 49 of the insulator 40. Further, the detector electrode 52 is arranged so that its rear end 52b in the axis O direction is positioned at the top end side (at the lower side in FIG. 2) with respect to the top end of the contact portion 56 with the packing 61. This is because insulation of the rear end 52b of the detector electrode 52 from the packing 61 is secured.

In the present embodiment, the detector electrode 52 is arranged so that the top end 52a in the axis O direction is positioned at a rear end side (at an upper side in FIG. 2) in the axis O direction with respect to the top end 29 of the metal shell 20. This arrangement can make it hard to detect the flame kernel occurring outside the space 55 (occurring at a top end side with respect to the top end 29 of the metal shell 20). As a consequence, it is possible to make a sharp distinction between the flame kernel occurring outside the space 55 and the flame kernel occurring in the space 55. The flame kernel occurring in the space 55 can therefore be detected surely and accurately.

It is preferable that a width W in a direction orthogonal to the axis O direction of the detector electrode 52 be 0.5 mm or more. This is because an area of the detector electrode 52 is secured then by suppressing noises, error detection is suppressed.

It is preferable that the top end 52a in the axis O direction of the detector electrode 52 be positioned 6 mm or more away from the top end 49 of the insulator 40 toward the rear end side (at the upper side in FIG. 2) in the axis O direction. That is, when setting a distance D1 between the top end 52a of the detector electrode 52 and the top end 49 of the insulator 40 in the axis O direction to 6 mm or more, an occurrence of electric discharge occurring due to a potential difference between the center electrode 70 and the detector electrode 52 can be suppressed. Since spark wear of the detector electrode 52 caused by the electric discharge can be suppressed, durability can be improved.

It is preferable that the top end 52a in the axis O direction of the detector electrode 52 be positioned 3 mm or more away from the top end of the contact portion 56 toward the top end side (at the lower side in FIG. 2) in the axis O direction. That is, when setting a distance D2 between the top end of the contact portion 56 and the top end 52a of the detector electrode 52 in the axis O direction to 3 mm or more, the detector electrode 52 can be set in an area where a surface temperature of the small diameter portion 47 easily increases by and according to growth of the flame kernel. When the surface temperature easily increases, the ion current easily flows. It is therefore possible to improve the detection accuracy of the pre-ignition.

It is preferable that the top end 52a of the detector electrode 52 be positioned at a top end side (at a lower side in FIG. 2) with respect to a position of a half (½) of a length L in the axis O direction of the small diameter portion 47 of the insulator 40 (a length L from the top end of the contact portion 56 to the top end 49 of the insulator 40 in the axis O direction). This is because an area (a length) of the detector electrode 52 detecting the ion current is secured and a detection sensitivity is ensured.

As shown in FIG. 3, at least a part of the detector electrode 52 is located in the space 55 at the first end portion 31 side of the ground electrode 30 with respect to an imaginary plane 58 that is a plane including the axis O and being perpendicular to a plane (a plane extending to right and left sides in FIG. 3) that includes an axis 57 extending from the first end portion 31 toward the second end portion 32 of the ground electrode 30 and the axis O. Since an origin (the flame kernel) of the LSPI is apt to occur in an area of the first end portion 31 side with respect to the imaginary plane 58 in the space 55, the above arrangement of the detector electrode 52 facilitates the detection of the LSPI, as compared with a case where the detector electrode 52 is located in an area of the second end portion 32 side of the ground electrode 30 with respect to the imaginary plane 58.

Figure 4:
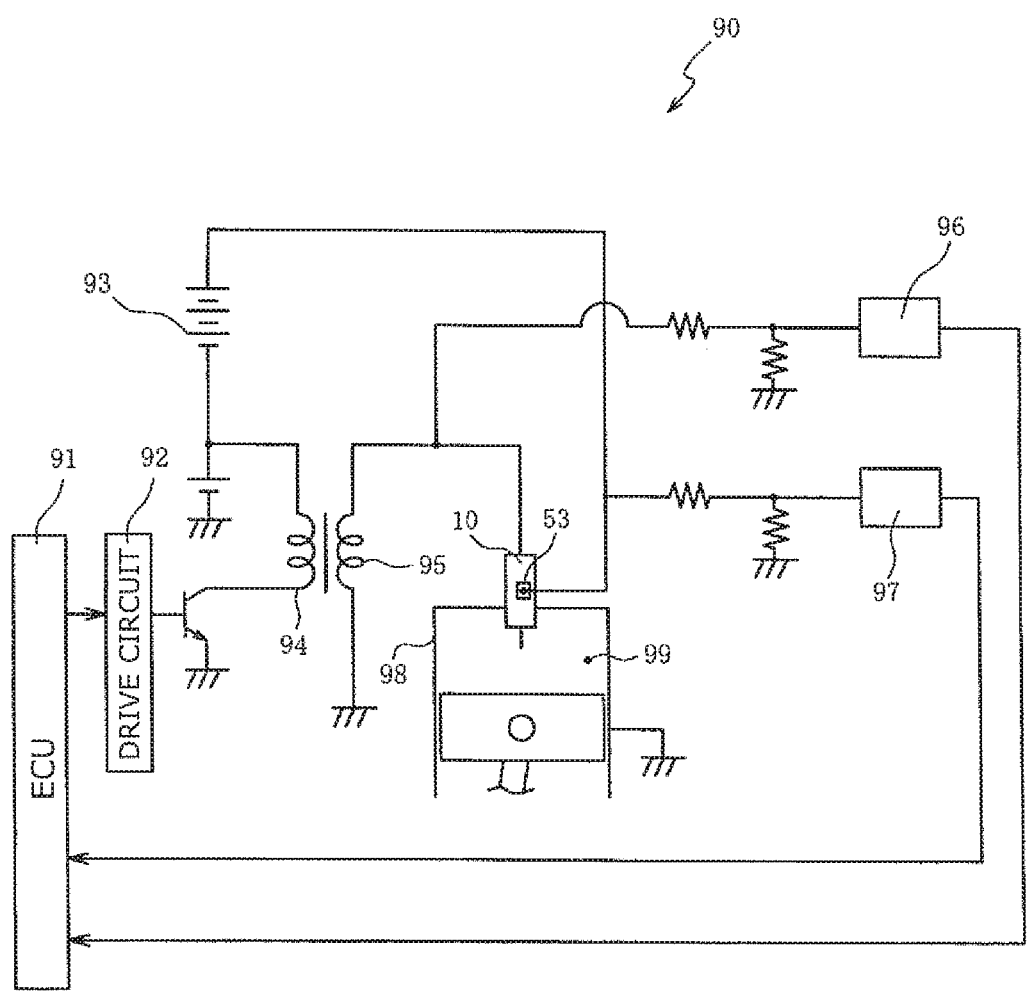
FIG. 4 is a block diagram showing an electric configuration of an ignition device.
Figure 5:
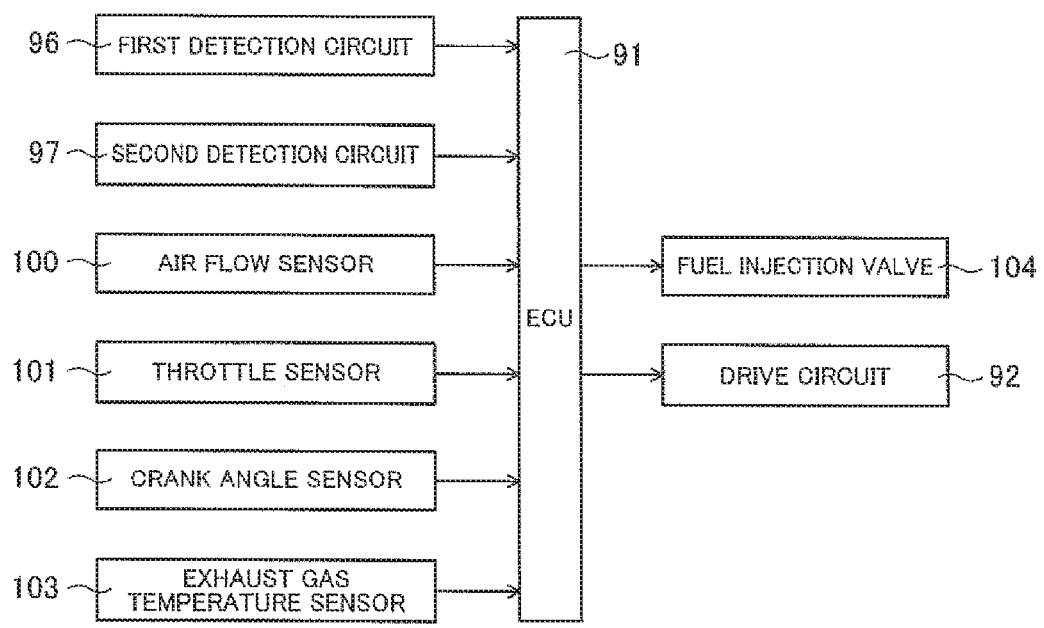
FIG. 5 is a block diagram showing an electric configuration of a control device.
Figure 6:
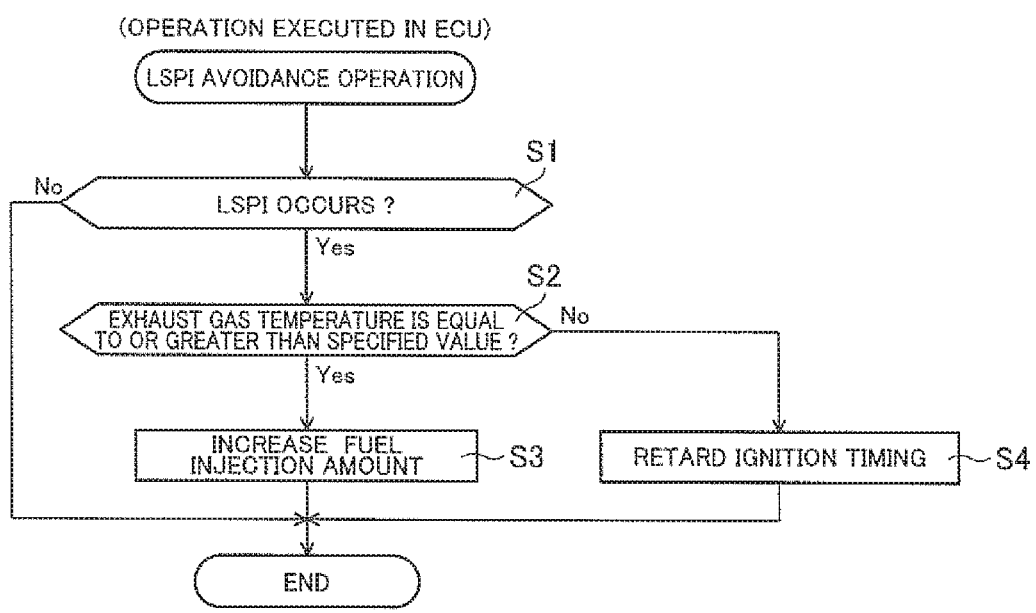
FIG. 6 is a flow chart showing a low speed pre-ignition avoidance operation.

Next, a control device configured to avoid the low speed pre-ignition (LSPI) will be explained with reference to FIGS. 4 to 6. FIG. 4 is a block diagram showing an electric configuration of an ignition device 90. FIG. 5 is a block diagram showing an electric configuration of the control device. FIG. 6 is a flow chart showing an LSPI avoidance operation.

As shown in FIG. 4, the spark plug 10 is mounted to a cylinder head so that its top end projects into a combustion chamber 99 of an engine 98. An engine control unit (ECU) 91 is a logical operation circuit having CPU, ROM, RAM and so on, and outputs an ignition command signal for the spark plug 10 to a drive circuit 92.

When a primary current of a primary coil 94 connected to a battery 93 is cut off by the drive circuit 92, a high voltage is produced at a secondary coil 95. The high voltage is applied across the center electrode 70 (see FIG. 1) and the ground electrode 30 of the spark plug 10, and a spark discharge occurs between the center electrode 70 and the ground electrode 30 and ignites air-fuel mixture in the combustion chamber 99. A voltage change of the secondary coil 95 is detected by a first detection circuit 96.

The battery 93 provides a potential difference between the terminal 53 and the metal shell 20 (see FIG. 1) of the spark plug 10. When the flame kernel occurs due to the LSPI and grows between the detector electrode 52 (see FIG. 1) and the metal shell 20 provided with the potential difference, the ion current flows between them. A voltage drop of the terminal 53 when the ion current flows is detected by a second detection circuit 97.

As shown in FIG. 5, the first detection circuit 96 and the second detection circuit 97 output their detection results to the ECU 91. In a case of the engine 98 in which no pre-ignition occurs, after the first detection circuit 96 detects the voltage change, the second detection circuit 97 detects the voltage drop. When the pre-ignition occurs in the engine 98, before the first detection circuit 96 detects the voltage change, the second detection circuit 97 detects the voltage drop. The ECU 91 recognizes or judges the presence or absence of the occurrence of the pre-ignition by comparing the detection result of the first detection circuit 96 and the detection result of the second detection circuit 97.

An air flow sensor 100 measures a quantity of air sucked into the combustion chamber 99 (see FIG. 4) from an inlet pipe (not shown), and outputs its measurement result to the ECU 91. A throttle sensor 101 detects an opening degree of a throttle valve (not shown), and outputs its detection result to the ECU 91. The opening degree of the throttle valve is adjusted according to a depression amount of an accelerator pedal (not shown), and by this opening degree adjustment of the throttle valve, the quantity of the air sucked into the combustion chamber 99 is controlled.

A crank angle sensor 102 detects a rotation speed of the engine 98 (see FIG. 4), and outputs its detection result to the ECU 91. An exhaust gas temperature sensor 103 is a sensor that is installed in the inlet pipe (not shown) connected to the combustion chamber 99. The exhaust gas temperature sensor 103 detects an exhaust gas temperature, and outputs its detection result to the ECU 91. A fuel injection valve 104 is a device that injects an amount of fuel, which corresponds to the quantity of the air sucked into the combustion chamber 99, toward the combustion chamber 99. The ECU 91 recognizes or determines an operating condition of the engine 98 on the basis of the detection results of the air flow sensor 100, the throttle sensor 101, the crank angle sensor 102 and others, and calculates a basic fuel injection amount and a basic ignition timing of the spark plug 10.

Here, when the LSPI (the low speed pre-ignition) continuously occurs or frequently occurs during operation of the engine 98, this causes a heavy knocking, and the engine 98 might suffer great damage. Further, when the LSPI occurs in the low rotation speed heavy load condition of the engine 98, this brings a problem of making it harder to increase a torque of the engine 98.

Therefore, in order to suppress the occurrence of the LSPI, as shown in FIG. 6, the ECU 91 executes the LSPI avoidance operation. This operation is repeatedly (e.g. at 0.2 ms interval) executed by the ECU 91 when the ECU 91 is supplied with power. The ECU 91 avoids the LSPI by adjusting or controlling the fuel injection valve 104 and the drive circuit 92.

When executing the LSPI avoidance operation, the ECU 91 judges whether or not the LSPI occurs by comparing the detection result of the first detection circuit 96 and the detection result of the second detection circuit 97 (at S1). If the LSPI does not occur (S1: NO), this LSPI avoidance operation is ended. If the LSPI occurs as a result of the operation at S1, the ECU 91 judges whether or not the exhaust gas temperature is equal to or greater than a specified value from the detection result of the exhaust gas temperature sensor 103 (at S2).

If the exhaust gas temperature is equal to or greater than the specified value as a result of the operation at S2 (S2: Yes), an injection amount of the fuel into the combustion chamber 99 from the fuel injection valve 104 is increased (at S3), and this LSPI avoidance operation is ended. When the fuel injection amount is increased, a temperature of the combustion chamber 99 decreases by heat of vaporization by an increased amount of the fuel and moderation of a combustion speed by the increase in the fuel, thereby avoiding the LSPI.

If the exhaust gas temperature is less than the specified value as a result of the operation at S2 (S2: No), in order to avoid the LSPI, by controlling an operation of the drive circuit 92, the ignition timing of the spark plug 10 is retarded (at S4), and this LSPI avoidance operation is ended.

Since the ECU 91 can properly control the ignition timing of the spark plug 10 and an air fuel ratio by the execution of the LSPI avoidance operation, the damage to the engine 98 can be prevented while securing the torque of the engine 98. Reliability of the engine 98 can consequently be increased. Further, since the LSPI occurring in the low rotation speed heavy load condition can be avoided, increase in efficiency of the engine by the high compression and/or the high supercharge can be encouraged.

Figure 7:
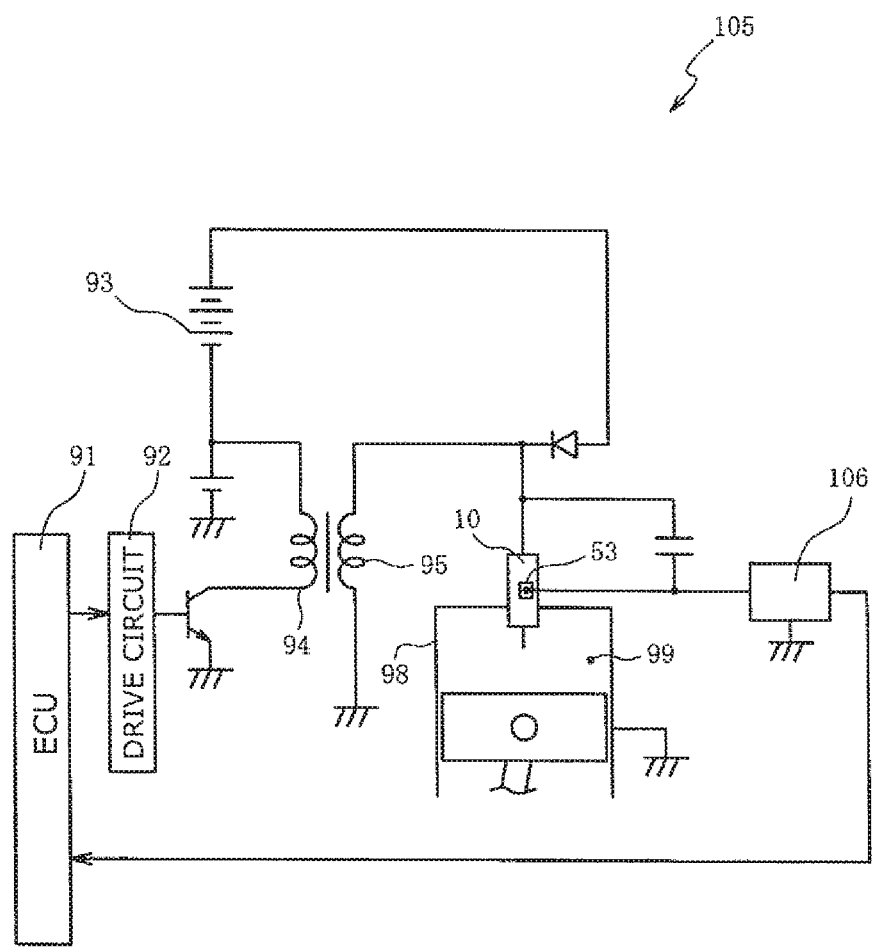
FIG. 7 is a block diagram showing an electric configuration of an ignition device according to a modified example.

Next, another ignition device 105 will be explained with reference to FIG. 7. FIG. 7 is a block diagram showing an electric configuration of the ignition device 105 according to a modified example. The same element or component as that of the ignition device 90 (FIG. 4) is denoted by the same reference sign, and its explanation will be omitted.

In the ignition device 105, the center electrode 70 (see FIG. 1) and the terminal 53 of the spark plug 10 are connected through a capacitor that prevents entry of a discharge current. A detection circuit 106 detects a voltage produced at the secondary coil 95 and the ion current, and outputs their detection results to the ECU 91. According to the ignition device 105, the ECU 91 recognizes or judges the presence or absence of the occurrence of the pre-ignition by comparing a time when the voltage is produced at the secondary coil 95 and a time when the ion current is generated on the basis of the detection results of the detection circuit 106.

Next, spark plugs according to second to tenth embodiments will be explained with reference to FIGS. 8A to 10B. The same element or component as that of the first embodiment is denoted by the same reference sign, and its explanation will be omitted. FIG. 8A is a left side view of a spark plug 110 with the metal shell 20 cut, according to a second embodiment. FIG. 8B is a left side view of a spark plug 120 with the metal shell 20 cut, according to a third embodiment. FIG. 8C is a left side view of a spark plug 130 with the metal shell 20 cut, according to a fourth embodiment. FIG. 8D is a left side view of a spark plug 140 with the metal shell 20 cut, according to a fifth embodiment.

Figure 9A:
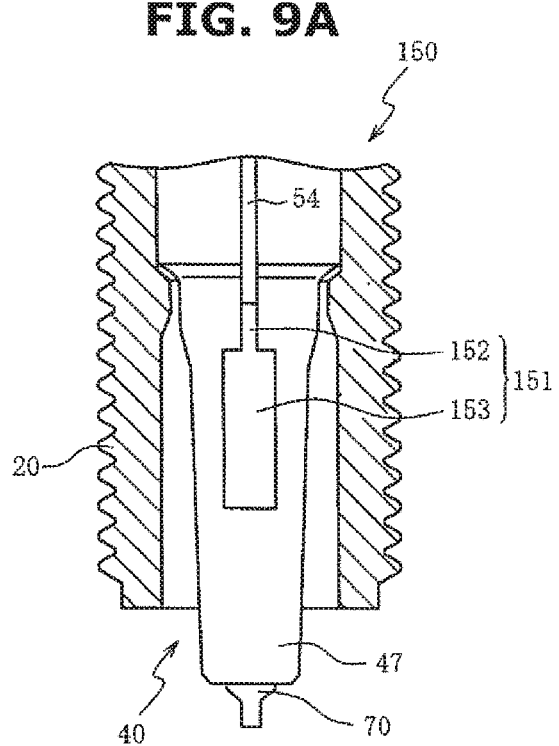
FIG. 9A is a left side view of a spark plug with the metal shell cut, according to a sixth embodiment.
Figure 9B:
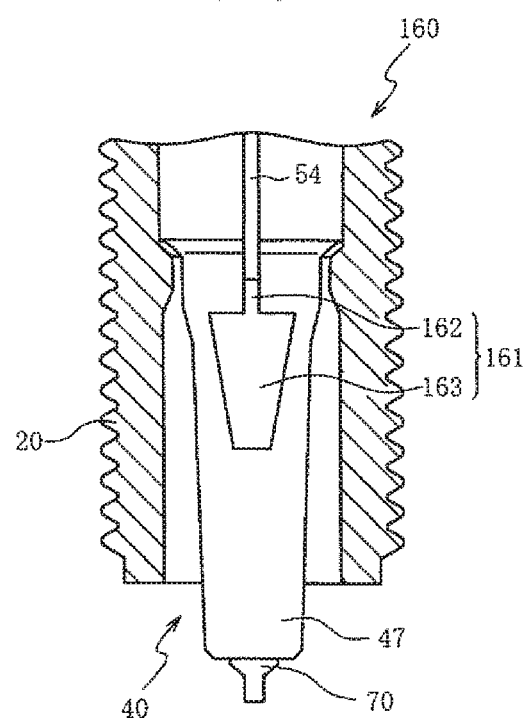
FIG. 9B is a left side view of a spark plug with the metal shell cut, according to a seventh embodiment.
Figure 9C:
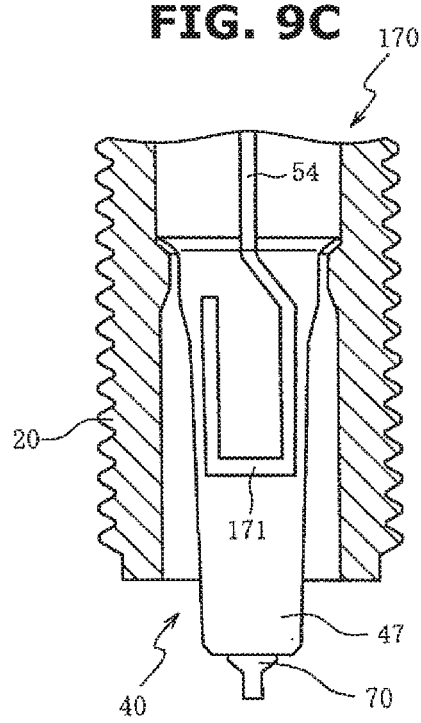
FIG. 9C is a left side view of a spark plug with the metal shell cut, according to an eighth embodiment.
Figure 9D:
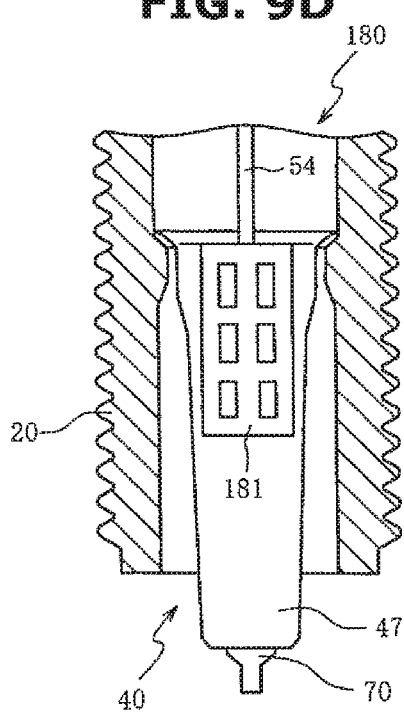
FIG. 9D is a left side view of a spark plug with the metal shell cut, according to a ninth embodiment.

FIG. 9A is a left side view of a spark plug 150 with the metal shell 20 cut, according to a sixth embodiment. FIG. 9B is a left side view of a spark plug 160 with the metal shell 20 cut, according to a seventh embodiment. FIG. 9C is a left side view of a spark plug 170 with the metal shell 20 cut, according to an eighth embodiment. FIG. 9D is a left side view of a spark plug 180 with the metal shell 20 cut, according to a ninth embodiment. In FIGS. 8A to 9D, the metal shell 20 and the rear end side in the axis direction of the insulator 40 are not illustrated.

In the spark plug 110 shown in FIG. 8A according to the second embodiment, a detector electrode 111 placed at the small diameter portion 47 of the insulator 40 has a linear first portion 112 extending in the axis direction and a circular second portion 113 formed at a top end in the axis direction of the first portion 112. The first portion 112 is connected to the conductor 51 (see FIG. 1) covered with the insulation member 54. The second portion 113 is positioned at the substantially middle in the axis direction of the small diameter portion 47. The second portion 113 is formed so that its width in a direction orthogonal to the axis direction is greater than that of the first portion 112, and also the second portion 113 is shaped into a circle whose outer edge has a small curvature. This can therefore reduce the tendency for electric discharge to occur between the detector electrode 111 and the center electrode 70. Durability of the detector electrode 111 can thus be improved.

In the spark plug 120 shown in FIG. 8B according to the third embodiment, a detector electrode 121 placed at the small diameter portion 47 has a third portion 122 provided at the first portion 112 positioned at a rear end side in the axis direction with respect to the second portion 113. The third portion 122 is formed into a circle whose width in a direction orthogonal to the axis direction is greater than that of the first portion 112. Since the detector electrode 121 has the third portion 122, in addition to working and effect obtained by the second embodiment, it is possible to increase the detection sensitivity.

In the spark plug 130 shown in FIG. 8C according to the fourth embodiment, a detector electrode 131 is formed into a band shape or a belt shape that encircles the outer periphery at a rear end side of the small diameter portion 47 throughout the entire circumference of the small diameter portion 47. Since a dissipation or radiation performance of heat of the small diameter portion 47 can be enhanced by the detector electrode 131, a heat resistance of the spark plug 130 can be improved.

In the spark plug 140 shown in FIG. 8D according to the fifth embodiment, a detector electrode 141 placed at the small diameter portion 47 has a first portion 142 bending and extending in the axis direction, a circular second portion 143 formed at a top end in the axis direction of the first portion 142 and a third portion 144 provided at the first portion 142 positioned at a rear end side in the axis direction with respect to the second portion 143. The second portion 143 is formed so that its width in a direction orthogonal to the axis direction is greater than that of the first portion 142, and also the second portion 143 is shaped into a circle having a small curvature. Since positions of the second portion 143 and the third portion 144 in a circumferential direction of the small diameter portion 47 are different by the bended first portion 142, in addition to working and effect obtained by the third embodiment, it is possible to extend a detection area (or a detection range) of the flame kernel in the circumferential direction.

In the spark plug 150 shown in FIG. 9A according to the sixth embodiment, a detector electrode 151 has a linear first portion 152 extending in the axis direction and a rectangular second portion 153 formed at a top end in the axis direction of the first portion 152. The second portion 153 is formed so that its top end is positioned at the substantially middle in the axis direction of the small diameter portion 47. Further, the second portion 153 is formed so that its width in a direction orthogonal to the axis direction is greater than that of the first portion 152. Therefore, even if electric discharge occurs between the second portion 153 and the center electrode 70 and a part of the second portion 153 wears, an area of the second portion 153 can be secured. Durability can thus be improved.

In the spark plug 160 shown in FIG. 9B according to the seventh embodiment, a detector electrode 161 has a linear first portion 162 extending in the axis direction and a second portion 163 formed at a top end in the axis direction of the first portion 162. The second portion 163 is formed into a trapezoid whose width in a direction orthogonal to the axis direction becomes narrower toward a top end side. Also in this case, it is possible to realize the same working and effect as those of the sixth embodiment.

In the spark plug 170 shown in FIG. 9C according to the eighth embodiment, a linear detector electrode 171 extending toward a top end side in the axis direction turns or bends at the substantially middle in the axis direction of the small diameter portion 47 toward a rear end side in the axis direction. Since the detector electrode 171 extends in the axis direction and also in a circumferential direction of the small diameter portion 47, it is possible to extend a detection area (or a detection range) of the flame kernel in the circumferential direction.

In the spark plug 180 shown in FIG. 9D according to the ninth embodiment, a detector electrode 181 is formed into a grid-shape (or a lattice-shape) at a rear end side of the small diameter portion 47. Since the detector electrode 181 extends in the axis direction and also in the circumferential direction of the small diameter portion 47, it is possible to extend a detection area (or a detection range) of the flame kernel in the circumferential direction.

FIG. 10A is a left side view of a spark plug 190 with the metal shell 20 cut, according to a tenth embodiment. FIG. 10B is a right side view of the spark plug 190. In FIGS. 10A and 10B, the metal shell 20 and the rear end side in the axis direction of the insulator 40 are not illustrated. Further, in FIG. 10B, the ground electrode 30 is not illustrated.

In the spark plug 190 shown in FIG. 10A according to the tenth embodiment, a detector electrode 191 placed at the small diameter portion 47 has a linear first portion 112 extending in the axis direction, a second portion 192 formed at a top end in the axis direction of the first portion 112 and a third portion 193 provided at the first portion 112 positioned at a rear end side in the axis direction with respect to the second portion 192. As shown in FIG. 10B, the second portion 192 and the third portion 193 are each formed into an annular shape that encircles the outer periphery of the small diameter portion 47 throughout the entire circumference of the small diameter portion 47. Since the second portion 192 and the third portion 193 are provided, it is possible to extend a detection area (or a detection range) of the flame kernel in the circumferential direction.

Figure 11:
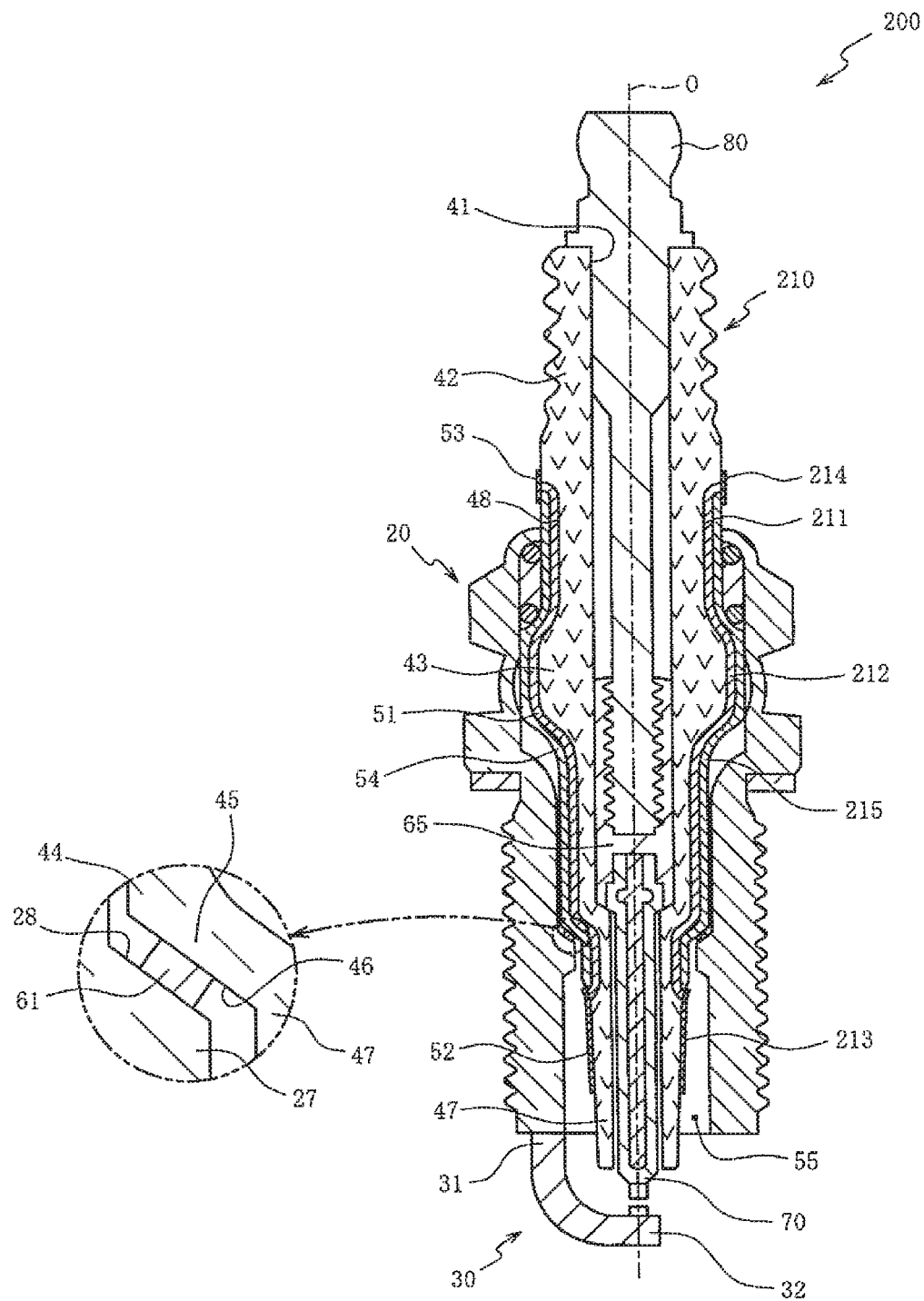
FIG. 11 is a cross section of a spark plug according to an eleventh embodiment.

Next, an eleventh embodiment will be explained with reference to FIG. 11. In the first to tenth embodiments, a case where one detector electrode is provided has been explained above. In contrast to this, in the eleventh embodiment, a plurality of detector electrode are provided. The same element or component as that of the first embodiment is denoted by the same reference sign, and its explanation will be omitted. FIG. 11 is a cross section, including the axis O, of a spark plug 200 according to the eleventh embodiment. In FIG. 11, a lower side of the drawing is called a top end side (or a tip end side) of the spark plug 200, and an upper side of the drawing is called a rear end side of the spark plug 200. As shown in FIG. 11, the spark plug 200 has the metal shell 20, the ground electrode 30, an insulator 210 and the center electrode 70.

The insulator 210 is provided, in addition to the conductor 51 and the detector electrode 52, with another conductor 212 and another detector electrode 213 for detecting the ion current. The insulator 210 has, at the outer periphery thereof, a groove 211 extending from the rear portion 42 to the small diameter portion 47, and the conductor 212 is placed on a bottom of the groove 211. The conductor 212 connects a terminal 214 provided on the outer periphery of the rear portion 42 at a rear end side with respect to the metal shell 20 and the detector electrode 213 provided on the outer periphery of the small diameter portion 47. The detector electrode 213 is arranged between the outer periphery of the insulator 40 and the inner periphery of the metal shell 20. The terminal 214 is a portion to which an external wiring (not shown) is connected.

The conductor 212 and the detector electrode 213 are formed with noble metal such as platinum which has heat resistance and whose resistivity is small. In the present embodiment, the conductor 212 and the detector electrode 213 are formed in the groove 211 by baking or printing a metal paste that contains the noble metal and/or silver etc. The conductor 212 is covered with an insulation member 215 embedded in the groove 211, then the conductor 212 is insulated from the metal shell 20. In the present embodiment, the insulation member 215 is formed by hardening a thermostabile inorganic adhesive. The detector electrode 52 and the detector electrode 213 are insulated from each other.

In the present embodiment, the conductor 212 and the detector electrode 213 are arranged at an opposite side to the conductor 51 and the detector electrode 52 respectively with respect to the axis O. However, arrangement of the conductor and the detector electrode is not limited to this arrangement. As long as at least a part of each of the detector electrodes 52 and 213 is located in the space 55, the detector electrodes 52 and 213 can be arbitrarily arranged within this area.

In the spark plug 200, since the detector electrodes 52 and 213 insulated from each other are set in the space 55, if a potential difference is given between the detector electrode 52 and the metal shell 20 and between the detector electrode 213 and the metal shell 20, the ion current caused by the flame kernel occurring in the space 55 can be detected. Since the spark plug 200 has the plurality of detector electrodes 52 and 213, by detecting whether the ion current flows to the detector electrode 52 or the ion current flows to the detector electrode 213, it is possible to locate or determine a position where the flame kernel occurs. Here, instead of giving a potential difference between the detector electrode 52 and the metal shell 20 and between the detector electrode 213 and the metal shell 20, by giving a potential difference between the detector electrodes 52 and 213, it is also possible to detect the ion current.

Figure 12:
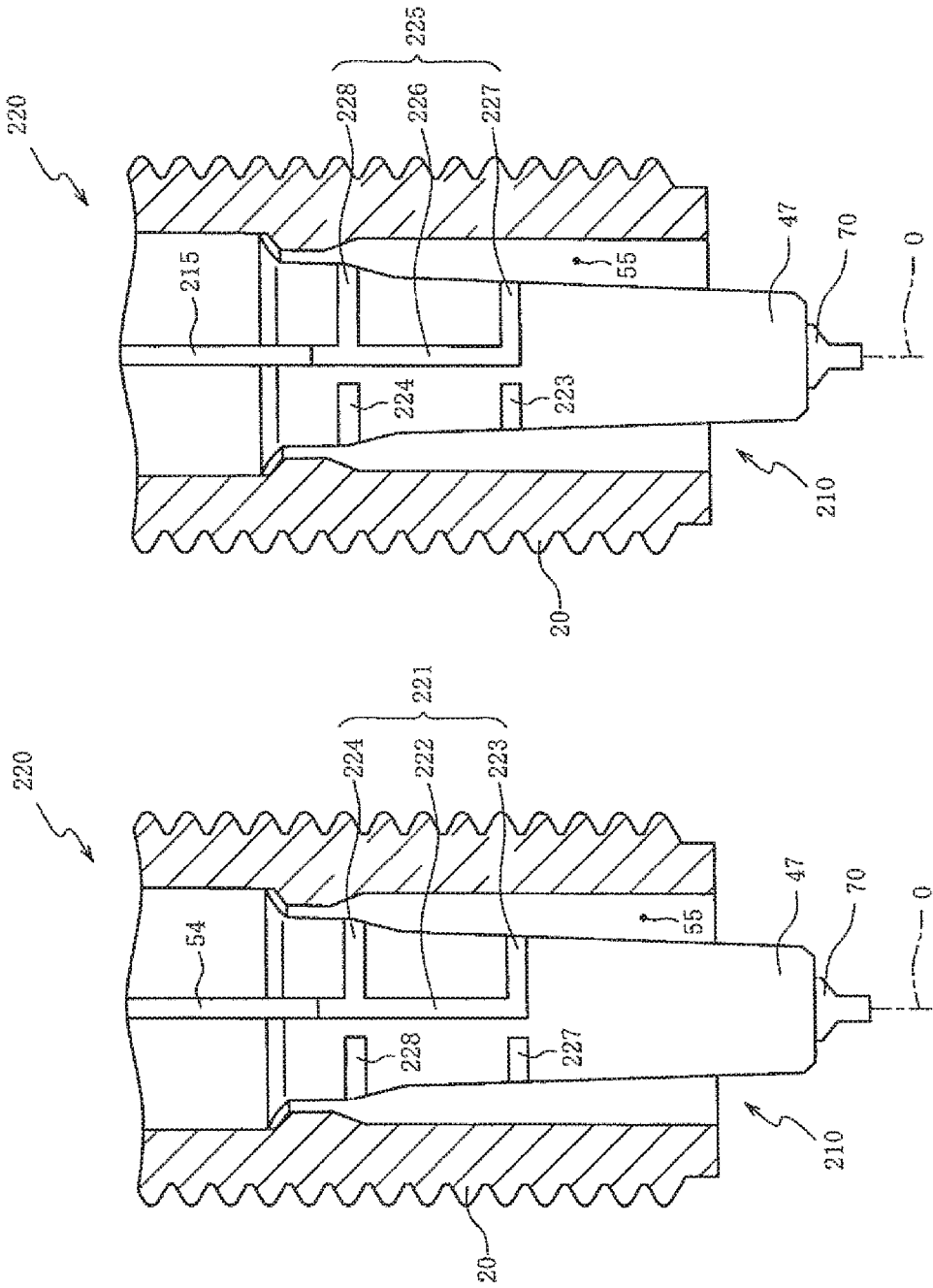
FIG. 12A is a left side view of a spark plug with the metal shell cut, according to a twelfth embodiment.
FIG. 12B is a right side view of the spark plug.

Next, a twelfth embodiment will be explained with reference to FIGS. 12A and 12B. The same element or component as that of the first embodiment is denoted by the same reference sign, and its explanation will be omitted. FIG. 12A is a left side view of a spark plug 220 with the metal shell 20 cut, according to the twelfth embodiment (viewed from the first end portion 31 of the ground electrode 30 toward the insulator 40). FIG. 12B is a right side view of the spark plug 220. In FIGS. 12A and 12B, the metal shell 20 and the rear end side in the axis O direction of the insulator 40 are not illustrated.

In the spark plug 220, as shown in FIGS. 12A and 12B, detector electrodes 221 and 225 are arranged at both sides, with respect to the axis O, of the small diameter portion 47 of the insulator 210. The detector electrodes 221 and 225 are insulated from each other. The detector electrode 221 has a linear first portion 222 extending in the axis O direction, a second portion 223 extending in the circumferential direction of the small diameter portion 47 from a top end in the axis O direction of the first portion 222 and a third portion 224 extending in the circumferential direction from the first portion 222 positioned at a rear end side in the axis O direction with respect to the second portion 223 with a distance or a space from the second portion 223 provided.

The detector electrode 225 has a linear first portion 226 extending in the axis O direction, a second portion 227 extending in the circumferential direction of the small diameter portion 47 from a top end in the axis O direction of the first portion 226 and a third portion 228 extending in the circumferential direction from the first portion 226 positioned at a rear end side in the axis O direction with respect to the second portion 227 with a distance or a space from the second portion 227 provided. Since the detector electrodes 221 and 225 extend in the axis direction and also in the circumferential direction of the small diameter portion 47, it is possible to extend a detection area (or a detection range) of the flame kernel in the circumferential direction.

IMPLEMENTATION

The present invention will be explained in detail by the following implementation. However, the present invention is not limited to the following implementation.

Implementation 1

Experimenters mounted the spark plug (see FIG. 2) having the linear detector electrode explained in the first embodiment and a pressure sensor to a turbocharged engine (displacement 1.6 L). Regarding the detector electrode of the spark plug, its top end in the axis direction is positioned at the middle in the axis direction of the small diameter portion of the insulator, and its width W in a direction orthogonal to the axis direction is 1 mm. Further, the detector electrode is arranged at the small diameter portion, facing the first end portion side of the ground electrode, of the insulator.

The experimenters ignited and burnt air-fuel mixture supplied to the engine by the spark plug. The experimenters detected the ion current by giving a potential difference between the detector electrode and the metal shell of the spark plug by the ignition device (see FIG. 4) explained in the first embodiment, and detected the occurrence and growth of the flame kernel (hereinafter, called a "plug LSPI") occurring in the space between the insulator and the metal shell of the spark plug. The experimenters detected, by the pressure sensor, the ignition and combustion of the air-fuel mixture by the spark plug and the plug LSPI.

The experimenters determined, by comparing a detection result by the pressure sensor and a detection result by the spark plug, an error detection rate (a ratio of the number of undetectable times of the plug LSPI by the spark plug to 100 detectable times of the plug LSPI by the pressure sensor) which indicates a ratio of the number of times the spark plug was not able to detect the plug LSPI despite the fact that the pressure sensor detected the plug LSPI.

Figure 13:
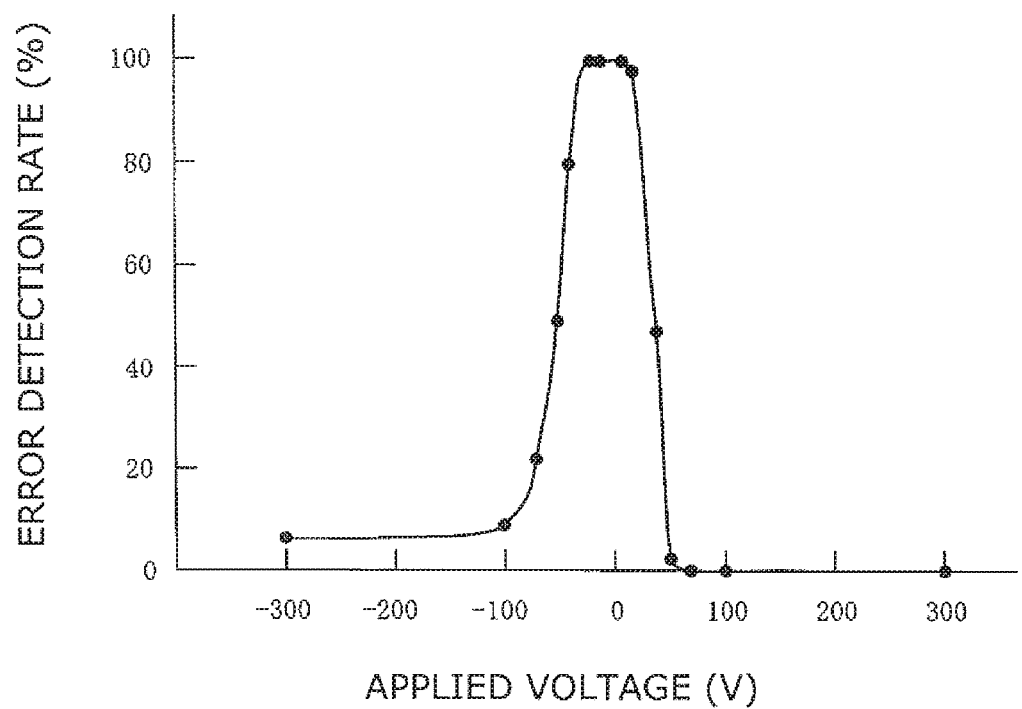
FIG. 13 is a drawing showing a relationship between an applied voltage to the spark plug and an error detection rate.

FIG. 13 is a drawing showing a relationship between an applied voltage to the spark plug (a potential difference between the detector electrode and the metal shell) and the error detection rate. A plus of the applied voltage means that a polarity of the detector electrode is "+", whereas a minus of the applied voltage means that the polarity of the detector electrode is "−". As is clear from FIG. 13, by setting the polarity of the detector electrode to "+" and setting the applied voltage to +50V or greater, it is possible to substantially remove or avoid the error detection of the plug LSPI.

Implementation 2

Figure 14:
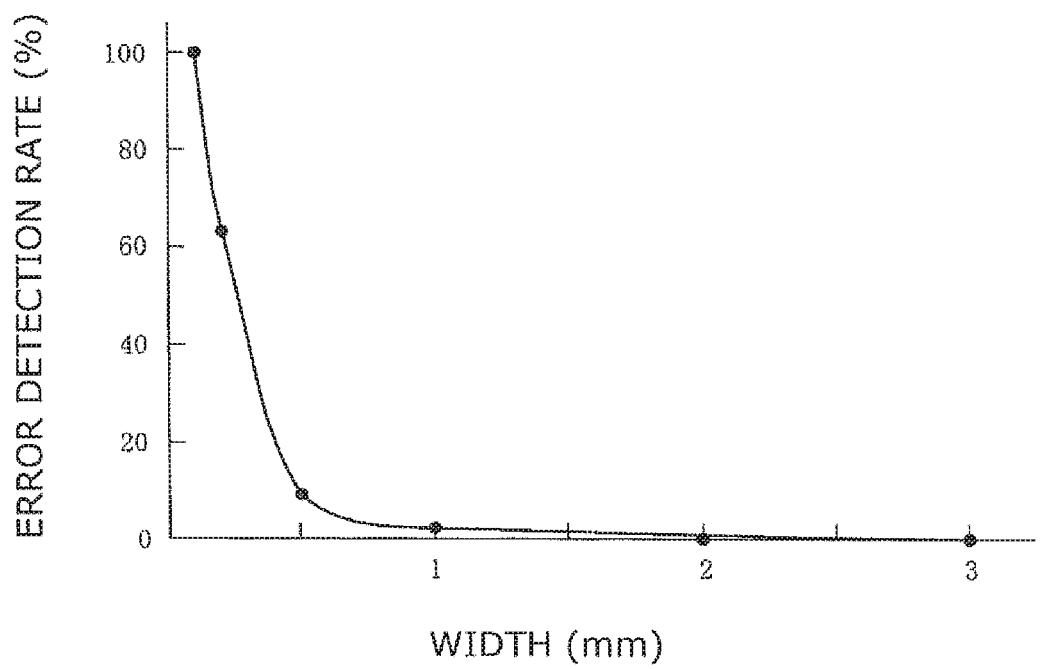
FIG. 14 is a drawing showing a relationship between a width of a detector electrode and the error detection rate.

The experimenters detected the plug LSPI in the same manner as the implementation 1, except that the width W (see FIG. 2) of the detector electrode of the spark plug was varied. The applied voltage (the potential difference between the detector electrode and the metal shell) was +50V. FIG. 14 is a drawing showing a relationship between the width of the detector electrode and the error detection rate. As is clear from FIG. 14, by setting the width of the detector electrode to 0.5 mm or greater, it is possible to decrease the error detection rate of the plug LSPI to 10% or less. The experimenters inferred that because an influence of noise etc. was able to be suppressed, the error detection rate was decreased.

Implementation 3

Figure 15:
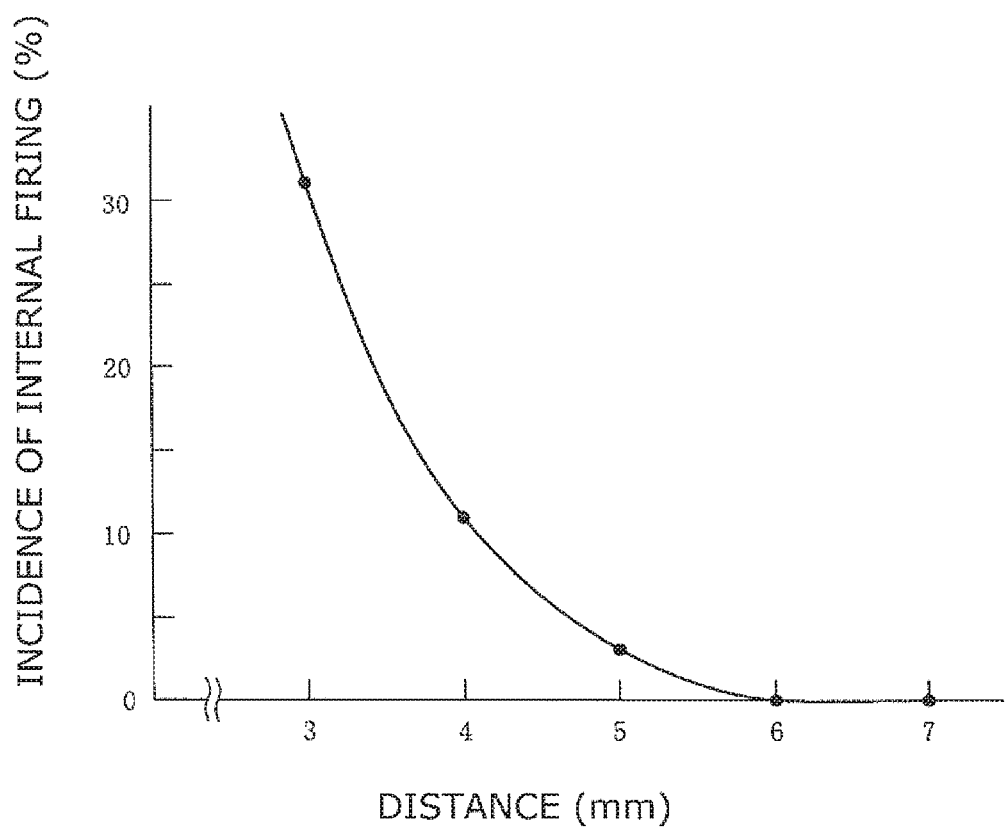
FIG. 15 is a drawing showing a relationship between a distance from a top end of an insulator to a top end of the detector electrode in an axis direction and an incidence of an internal firing (or an internal flying spark).

The experimenters detected the plug LSPI in the same manner as the implementation 1, except that the distance D1 (see FIG. 2) from the top end of the insulator to the top end of the detector electrode of the spark plug in the axis direction was varied. The applied voltage (the potential difference between the detector electrode and the metal shell) was +50V. FIG. 15 is a drawing showing a relationship between the distance D1 from the top end of the insulator to the top end of the detector electrode in the axis direction and an incidence of an internal firing (or an internal flying spark) (electric discharge between the center electrode and the detector electrode). As is clear from FIG. 15, by setting the distance D1 to 6 mm or greater, it is possible to detect the plug LSPI while suppressing the occurrence of the internal firing. This is because the electric discharge between the center electrode and the detector electrode can be suppressed and a detection sensitivity of the plug LSPI can be increased.

Implementation 4

The experimenters detected the plug LSPI in the same manner as the implementation 1, except that the distance D2

Figure 16:
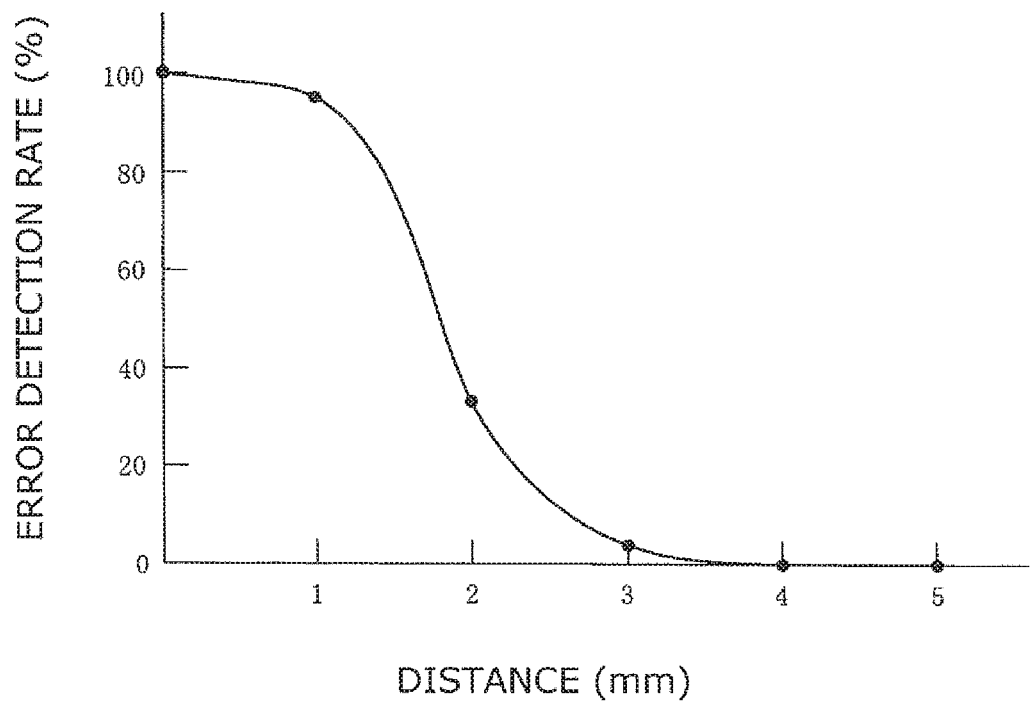
FIG. 16 is a drawing showing a relationship between a distance from a top end of a contact portion to the top end of the detector electrode in the axis direction and the error detection rate.

(see FIG. 2) from the top end of the contact portion between the insulator and the packing to the top end of the detector electrode of the spark plug in the axis direction was varied. The applied voltage (the potential difference between the detector electrode and the metal shell) was +50V. FIG. 16 is a drawing showing a relationship between the distance D2 from the top end of the contact portion to the top end of the detector electrode in the axis direction and the error detection rate. As is clear from FIG. 16, by setting the distance D2 to 3 mm or greater, it is possible to decrease the error detection rate of the plug LSPI to 10% or less. The experimenters inferred that because the detector electrode was able to be set in an area where temperature easily increases by and according to growth of the flame kernel and the ion current easily flows by setting the distance D2 to 3 mm or greater, the error detection rate was decreased.

Implementation 5

Figure 17:
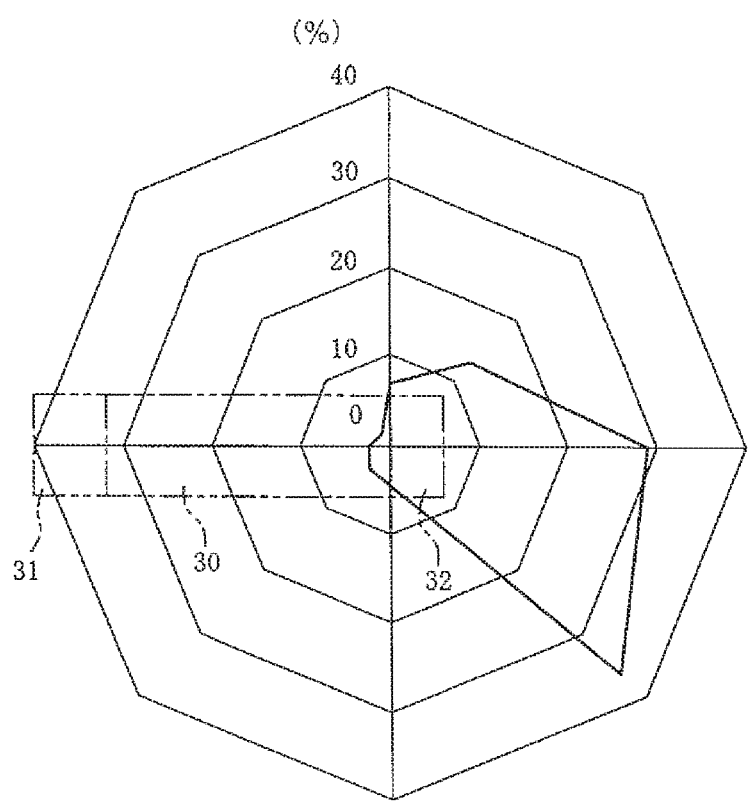
FIG. 17 is a drawing showing a relationship between a position in a circumferential direction of the detector electrode and the error detection rate.

The experimenters detected the plug LSPI in the same manner as the implementation 1, except that a position in a circumferential direction of the detector electrode of the spark plug was varied with respect to the ground electrode. The applied voltage (the potential difference between the detector electrode and the metal shell) was +50V. FIG. 17 is a drawing showing a relationship between the position in the circumferential direction of the detector electrode and the error detection rate. In FIG. 17, a center indicates the axis O, and a lateral axis indicates a position of the axis (57, see FIG. 3) extending from the first end portion 31 toward the second end portion 32 of the ground electrode 30. A vertical axis indicates the imaginary plane (58, see FIG. 3) including the axis O.

As is clear from FIG. 17, by arranging the detector electrode at the first end portion 31 side of the ground electrode 30 with respect to the imaginary plane (the vertical axis) (at a left side with respect to the center in FIG. 17), it is possible to decrease the error detection rate of the plug LSPI to 10% or less. The experimenters inferred that because a frequency of occurrence of the plug LSPI is high at the first end portion side of the ground electrode with respect to the imaginary plane in the space between the insulator and the metal shell, the error detection rate was decreased.

Although the present invention has been explained on the basis of the above embodiments, the present invention is not limited to the above embodiments, and the present invention can be modified within technical ideas of the present invention. For instance, although shape and size of the detector electrode are shown as an example in the above embodiments, these shape and size can be arbitrarily set.

In the above embodiments, a case where the top end 49 of the insulators 40 and 210 protrudes toward the top end side in the axis O direction with respect to the top end 29 of the metal shell 20 has been explained. However, a position of the top end 49 of the insulators 40 and 210 is not necessarily limited to this. As a matter of course, the top end 49 of the insulators 40 and 210 could be positioned at the rear end side in the axis O direction with respect to the top end 29 of the metal shell 20. Also in this case, it is possible to realize the same working and effect as those of the above embodiments.

In the above embodiments, a case where the packing 61 is provided between the inner periphery (the shelf portion 27) of the metal shell 20 and the outer periphery (the reduced diameter portion 45) of the insulators 40 and 210 and the metal shell 20 holds the insulators 40 and 210 through the packing 61 has been explained. However, the hold of the insulators 40 and 210 is not necessarily limited to this. As a matter of course, the packing 61 can be removed, and the inner periphery (the shelf portion 27) of the metal shell 20 and the outer periphery (the reduced diameter portion 45) of the insulators 40 and 210 contact each other, then the metal shell 20 can hold the insulators 40 and 210 through this contact portion. Also in this case, it is possible to realize the same working and effect as those of the above embodiments.

In the above embodiments, a case where the detector electrode is provided at the insulators 40 and 210 has been explained. However, a position at which the detector electrode is provided is not necessarily limited to this, as long as the detector electrode is located in the space 55 formed between the insulators 40 and 210 and the metal shell 20. As a matter of course, the detector electrode could be provided at the inner periphery of the metal shell 20, or the detector electrode could be provided with the detector electrode being in noncontact with both of the metal shell 20 and the insulators 40 and 210.

In the above embodiments, a case where the conductors 51 and 212 and the terminals 53 and 214 are formed by baking or printing the metal paste has been explained. However, a method of forming the conductors 51 and 212 and the terminals 53 and 214 is not necessarily limited to this. As a matter of course, instead of the metal paste, the conductors 51 and 212 could be formed by metal wire, and the terminals 53 and 214 could be formed by metal plate.

In the above embodiments, a case where the conductors 51 and 212 and the terminals 53 and 214 are formed on the surface of the insulators 40 and 210 has been explained. However, an arrangement of the conductors 51 and 212 and the terminals 53 and 214 is not necessarily limited to this, as long as the conductor is insulated from the center electrode 70, the metal shell 20 and the ground electrode 30. As a matter of course, the conductor is sheathed for ensuring insulation and embedded in the metal shell 20 or arranged between the metal shell 20 and insulators 40 and 210, for example.

In the above embodiments, a case where the top end in the axis O direction of the detector electrode is located at the rear end side in the axis O direction with respect to the top end 29 of the metal shell 20 has been explained. However, a position of the top end in the axis O direction of the detector electrode is not necessarily limited to this. As a matter of course, the top end in the axis O direction of the detector electrode could protrude to the top end side in the axis O direction with respect to the top end 29 of the metal shell 20. In this case, it is possible to detect not only the flame kernel occurring in the space 55 formed between the insulator 40 and the metal shell 20, but also the flame kernel occurring outside the space 55, depending on a length and an area of a protruding part of the detector electrode from the top end 29 of the metal shell 20.

In the eleventh embodiment, a case where two detector electrodes 52 and 213 are provided has been explained. However, the number of the detector electrode is not necessarily limited to this. As a matter of course, one or plurality of the detector electrodes can be provided as necessary.

In the above embodiments, a case where the second end portion 32 side of the ground electrode 30 whose first end portion 31 is connected to the metal shell 20 is bent or curved has been explained. However, a shape of the ground electrode 30 is not necessarily limited to this. As a matter of course, instead of the curved ground electrode 30, a linear ground electrode can be used. In this case, the top end side of the metal shell 20 extends in the axis O direction, and the first end portion of the linear ground electrode is connected to the metal shell 20, then the second end portion of the ground electrode faces the center electrode 70.

In the above embodiments, a case where the ground electrode 30 is arranged so that the second end portion 32 of the ground electrode 30 crosses the axis O of the center electrode 70 has been explained. However, an arrangement of the ground electrode 30 is not necessarily limited to this, and a position relationship between the center electrode 70 and ground electrode 30 can be properly set. As the position relationship between the center electrode 70 and ground electrode 30, for instance, the ground electrode 30 could be set so that a side surface of the center electrode 70 and the second end portion 32 of the ground electrode 30 face each other, or the ground electrode 30 might be set so that the axis 57 of the ground electrode 30 obliquely crosses the axis O.

EXPLANATION OF REFERENCE

10, 110, 120, 130, 140, 150, 160, 170, 180, 190, 200, 220 . . . spark plug, 20 . . . metal shell, 26 . . . thread portion, 27 . . . shelf portion, 30 . . . ground electrode, 31 . . . first end portion, 32 . . . second end portion, 40, 210 . . . insulator, 41 . . . axial hole, 45 . . . reduced diameter portion, 51, 212 . . . conductor, 52, 111, 121, 131, 141, 151, 161, 171, 181, 191, 213, 221, 225 . . . detector electrode, 52*a* . . . top end, 53, 214 . . . terminal, 55 . . . space, 56 . . . contact portion, 57 . . . axis, 58 . . . imaginary plane, 61 . . . packing, 70 . . . center electrode, W . . . width, O . . . axis

The invention claimed is:

1. A spark plug, comprising:
   a tubular insulator having a reduced diameter portion and an axial hole, the reduced diameter portion having an outside diameter that becomes smaller toward a top end side of the spark plug, the axial hole extending from the top end side toward a rear end side of the spark plug along an axis (O) of the spark plug;
   a center electrode disposed in the axial hole;
   a tubular metal shell placed at an outer periphery of the insulator, the metal shell having, at an inner periphery thereof, a shelf portion that protrudes inward in a radial direction of the metal shell and holds the reduced diameter portion of the insulator directly or through a ring-shaped packing from the top end side, the metal shell further having, at an outer periphery thereof, a thread portion;
   a ground electrode connected to the metal shell and facing the center electrode through a spark gap;
   a terminal located at the rear end side with respect to the thread portion;
   a detector electrode provided at a portion located at the top end side with respect to a top end of a contact portion between the reduced diameter portion and the shelf portion or the packing, the detector electrode being arranged in a space formed between the outer periphery of the insulator and the inner periphery of the metal shell; and
   a conductor connecting the detector electrode and the terminal,
   wherein the detector electrode and the conductor are insulated from the center electrode, the metal shell, and the ground electrode.

2. The spark plug as claimed in claim 1, wherein a width (W) in a direction orthogonal to an axis direction of the detector electrode is 0.5 mm or more.

3. The spark plug as claimed in claim 1, wherein a top end of the detector electrode is positioned at the rear end side with respect to a top end of the metal shell.

4. The spark plug as claimed in claim 1, wherein a top end of the detector electrode is positioned 6 mm or greater away from a top end of the insulator toward the rear end side.

5. The spark plug as claimed in claim 1, wherein a top end of the detector electrode is positioned 3 mm or greater away from the top end of the contact portion toward the top end side.

6. The spark plug as claimed in claim 1, wherein a first end portion of the ground electrode is connected to the metal shell,
   wherein a second end portion of the ground electrode crosses the axis (O) of the spark plug and faces the center electrode, and
   wherein at least a part of the detector electrode is located at a first end portion side of the ground electrode with respect to an imaginary plane, the imaginary plane including the axis (O) of the spark plug and being perpendicular to a plane that includes an axis extending from the first end portion toward the second end portion of the ground electrode and the axis (O) of the spark plug.

* * * * *